US008243017B2

(12) United States Patent
Brodersen et al.

(10) Patent No.: US 8,243,017 B2
(45) Date of Patent: Aug. 14, 2012

(54) MENU OVERLAY INCLUDING CONTEXT DEPENDENT MENU ICON

(75) Inventors: Rainer Brodersen, San Jose, CA (US); Rachel Clare Goldeen, Mountain View, CA (US); Mihnea Calin Pacurariu, Los Gatos, CA (US); Jeffrey Ma, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 611 days.

(21) Appl. No.: 11/549,053

(22) Filed: Oct. 12, 2006

(65) Prior Publication Data

US 2008/0062127 A1 Mar. 13, 2008

Related U.S. Application Data

(60) Provisional application No. 60/825,234, filed on Sep. 11, 2006.

(51) Int. Cl.
*G09G 5/08* (2006.01)
(52) U.S. Cl. ... 345/158; 345/169; 345/173; 348/333.02; 348/734; 463/37; 715/716; 715/810; 715/864
(58) Field of Classification Search .................. 345/100, 345/158, 204, 214, 169, 173; 348/601, 473, 348/333.02, 734; 715/825, 840, 716, 810, 715/864; 463/37
See application file for complete search history.

(56) References Cited

U.S. PATENT DOCUMENTS

| 4,704,703 | A | | 11/1987 | Fenwick |
| 5,303,388 | A | | 4/1994 | Kreitman et al. |
| 5,317,732 | A | * | 5/1994 | Gerlach et al. ........................ 1/1 |
| 5,485,197 | A | | 1/1996 | Hoarty |
| 5,515,486 | A | | 5/1996 | Amro et al. |
| 5,523,796 | A | | 6/1996 | Marshall et al. |
| 5,541,379 | A | | 7/1996 | Kim |
| 5,544,354 | A | | 8/1996 | Ay et al. |
| 5,585,866 | A | | 12/1996 | Miller et al. |
| 5,594,509 | A | * | 1/1997 | Florin et al. ..................... 725/43 |
| 5,604,544 | A | * | 2/1997 | Bertram ....................... 348/601 |
| 5,621,456 | A | | 4/1997 | Florin et al. |
| 5,629,733 | A | | 5/1997 | Youman et al. |
| 5,635,989 | A | | 6/1997 | Rothmuller |
| 5,673,401 | A | | 9/1997 | Volk et al. |

(Continued)

FOREIGN PATENT DOCUMENTS

DE 102 07 872 A1 9/2003

(Continued)

OTHER PUBLICATIONS

Griffin Technologies. "TuneCenter Home Media Center for iPod." [Retrieved online on Jun. 11, 2009] Feb 7, 2006. [Retrieved from internet] <URL: http://web.archive.org/web/20060207114534/www.griffintechnology.com/products/tunecenter/>.

(Continued)

*Primary Examiner* — Lun-Yi Lao
*Assistant Examiner* — Sosina Abebe
(74) *Attorney, Agent, or Firm* — Fish & Richardson P.C.

(57) ABSTRACT

A video device displays video in one of a plurality of contexts in an onscreen display area. In response to the menu command, the video device generates a menu overlay within the onscreen display area while maintaining the video within the menu overlay, and generates within the menu overlay a context icon based on the selected context.

29 Claims, 28 Drawing Sheets

U.S. PATENT DOCUMENTS

| | | |
|---|---|---|
| 5,678,015 A | 10/1997 | Goh |
| 5,724,492 A | 3/1998 | Matthews et al. |
| 5,745,710 A | 4/1998 | Clanton et al. |
| 5,745,717 A | 4/1998 | Vayda |
| 5,898,435 A | 4/1999 | Nagahara et al. |
| 6,028,600 A | 2/2000 | Rosin et al. |
| 6,169,986 B1 | 1/2001 | Bowman et al. |
| 6,243,142 B1 | 6/2001 | Mugura et al. |
| 6,266,098 B1 | 7/2001 | Cove et al. |
| 6,285,371 B1 | 9/2001 | Gould et al. |
| 6,344,861 B1 | 2/2002 | Naughton et al. |
| 6,434,547 B1 | 8/2002 | Mishelevich et al. |
| 6,504,575 B1 * | 1/2003 | Ramirez et al. .......... 348/333.02 |
| 6,526,577 B1 | 2/2003 | Knudson et al. |
| 6,538,635 B1 | 3/2003 | Ringot |
| 6,563,515 B1 * | 5/2003 | Reynolds ....................... 345/721 |
| 6,690,391 B1 * | 2/2004 | Proehl ............................ 345/720 |
| 6,751,606 B1 | 6/2004 | Fries et al. |
| 6,857,128 B1 | 2/2005 | Borden et al. |
| 6,931,231 B1 | 8/2005 | Griffin |
| 7,046,230 B2 | 5/2006 | Zadesky et al. |
| 7,117,440 B2 * | 10/2006 | Gordon et al. ................ 715/721 |
| 7,290,274 B1 | 10/2007 | Banker et al. |
| 7,292,769 B2 * | 11/2007 | Watanabe et al. ............. 386/351 |
| 7,426,467 B2 * | 9/2008 | Nashida ........................ 704/275 |
| 7,624,090 B2 * | 11/2009 | Fujisawa et al. .............. 386/248 |
| 7,647,312 B2 | 1/2010 | Dai |
| 2002/0133826 A1 | 9/2002 | Ohyama |
| 2002/0157099 A1 | 10/2002 | Schrader et al. |
| 2002/0173344 A1 | 11/2002 | Cupps et al. |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0095096 A1 | 5/2003 | Robbin et al. |
| 2003/0115602 A1 | 6/2003 | Knee et al. |
| 2003/0126607 A1 | 7/2003 | Philips et al. |
| 2003/0135725 A1 | 7/2003 | Schirmer et al. |
| 2003/0156146 A1 | 8/2003 | Suomela et al. |
| 2004/0060063 A1 * | 3/2004 | Russ et al. ..................... 725/46 |
| 2004/0095396 A1 | 5/2004 | Stavely et al. |
| 2004/0183756 A1 | 9/2004 | Freitas et al. |
| 2004/0189695 A1 | 9/2004 | Kurtz et al. |
| 2004/0224726 A1 | 11/2004 | Yassa |
| 2005/0002638 A1 | 1/2005 | Putterman et al. |
| 2005/0144251 A1 * | 6/2005 | Slate .............................. 709/215 |
| 2005/0235209 A1 * | 10/2005 | Morita et al. ................. 715/716 |
| 2005/0246732 A1 | 11/2005 | Dudkiewicz et al. |
| 2005/0251826 A1 * | 11/2005 | Orr ................................ 725/46 |
| 2005/0283468 A1 | 12/2005 | Kamvar et al. |
| 2006/0015823 A1 | 1/2006 | Chao et al. |
| 2006/0020966 A1 | 1/2006 | Poslinski |
| 2006/0028454 A1 | 2/2006 | Branton et al. |
| 2006/0033751 A1 | 2/2006 | Keely et al. |
| 2006/0055662 A1 | 3/2006 | Rimas-Ribikauskas et al. |
| 2006/0059525 A1 | 3/2006 | Jerding et al. |
| 2006/0140584 A1 * | 6/2006 | Ellis et al. ....................... 386/83 |
| 2006/0149709 A1 | 7/2006 | Krakirian et al. |
| 2006/0156353 A1 | 7/2006 | Dorner |
| 2006/0173974 A1 | 8/2006 | Tang |
| 2006/0206454 A1 | 9/2006 | Forstall et al. |
| 2006/0253787 A1 * | 11/2006 | Fogg .............................. 715/752 |
| 2007/0094731 A1 * | 4/2007 | Teodosiu et al. ................ 726/24 |
| 2007/0220580 A1 | 9/2007 | Putterman et al. |
| 2008/0120289 A1 | 5/2008 | Golan et al. |
| 2010/0306404 A1 * | 12/2010 | Wakita et al. ................. 709/231 |

FOREIGN PATENT DOCUMENTS

| | | |
|---|---|---|
| EP | 1 028 570 A1 | 8/2000 |
| EP | 1 052 566 A1 | 11/2000 |
| WO | WO 95/01056 | 1/1995 |
| WO | WO 99/27435 | 6/1999 |

OTHER PUBLICATIONS

Home TiVo Support (Using WishList Searches) [on-line], [Retrieved Jul. 11, 2006]. Retrieved from the Internet <URL: http://customersupport.tivo.com/knowbase/root/public/tv1528.htm>.

Torrone, Philip. "How-To Turn your iPod into a Universal Infared Remote Control." [Retrieved online on Jun. 11, 2009] Jul. 27, 2004. [Retrieved from the Internet] <URL: http://features.engadget.com/2004/07/27/how-to-turn-your-ipod-in-to-a-universal-infrared-remote-control/>.

Wolski, Michael. "C# Remote Control Using the Audio Port." [Retrieved online on Jun. 11, 2009] Apr. 20, 2004. [Retrieved from the Internet] <URL: http://www.codeproject.com/KB/mobile/PocketBeamer.aspx.

International Search Report and Written Opinion for PCT Application No. PCT/US2007/077928, dated Oct. 8, 2009, 18 pages.

International Preliminary Report on Patentability for PCT Application No. PCT/US2007/077928, dated Oct. 13, 2009, 9 pages.

International Search Report and Written Opinion for PCT Application No. PCT/US2007/078060, dated Dec. 28, 2007, 13 pages.

International Preliminary Report on Patentability for PCT Application No. PCT/US2007/078060, dated Mar. 26, 2009, 8 pages.

Chinese Office Action dated May 17, 2011 from related Chinese Application No. 200780040206.5, 9 pages.

\* cited by examiner

| CONTEXT | STATE | REMOTE ACTION | RESULT |
|---|---|---|---|
| RECEIVED | PAUSED | ROTATE | SCRUB/JOG |
| | | CLICK LEFT | PREVIOUS CHANNEL |
| | | HOLD LEFT | 10 SECONDS BACK |
| | | CLICK RIGHT | NEXT CHANNEL |
| | | HOLD RIGHT | 30 SECOND SKIP |
| | | CLICK UP (MENU) | DISMISS INFO OVERLAY |
| | | CLICK DOWN (PLAY/PAUSE) | PLAY, DISMISS INFO OVERLAY AFTER TIMEOUT |
| | | SELECT | SHOW INFO |

| CONTEXT | STATE | REMOTE ACTION | RESULT |
|---|---|---|---|
| RECEIVED | INFO OVERLAY WITH TRANSPORT BAR | ROTATE | SCRUB/JOG |
| | | CLICK LEFT | PREVIOUS CHANNEL |
| | | HOLD LEFT | 10 SECONDS BACK |
| | | CLICK RIGHT | NEXT CHANNEL |
| | | HOLD RIGHT | 30 SECOND SKIP |
| | | CLICK UP (MENU) | DISMISS INFO |
| | | CLICK DOWN (PLAY/PAUSE) | PAUSE |

FIG. 44

| CONTEXT | STATE | REMOTE ACTION | RESULT |
|---|---|---|---|
| RECEIVED | CHANNEL LIST OVER RECEIVED VIDEO | ROTATE | MOVE UP/DOWN CHANNEL LIST |
| | | MAINTAIN TOUCH ACTUATION | SHOW PREVIEW AFTER DELAY |
| | | CESSATION OF TOUCH ACTUATION | SHOW PREVIEW |
| | | HOLD LEFT | ROTATE TO LIST TYPE TO LEFT (RECORDINGS) |
| | | CLICK RIGHT | GO TO FULL SCREEN GRID |
| | | HOLD RIGHT | ROTATE TO LIST TYPE TO RIGHT (BROWSE) |
| | | CLICK UP (MENU) | DISMISS LIST |
| | | SELECT | GO TO SELECTED CHANNEL |

FIG. 45

| CONTEXT | STATE | REMOTE ACTION | RESULT |
|---|---|---|---|
| RECEIVED | RECORDINGS LIST OVER RECEIVED VIDEO | ROTATE | MOVE UP/DOWN RECORDINGS LIST |
| | | HOLD LEFT | ROTATE TO LIST TYPE TO LEFT (SEARCH) |
| | | HOLD RIGHT | ROTATE TO LIST TYPE TO RIGHT (CHANNEL LIST) |
| | | CLICK UP (MENU) | DISMISS LIST |
| | | CLICK DOWN (PLAY/PAUSE) | RECORD VIDEO EVENT; IF FOLDER MENU ITEM, NO ACTION |
| | | SELECT | GO TO ACTION MENU FOR SINGLE MENU ITEM; ENTER FOLDER IF FOLDER MENU ITEM |

FIG. 46

| CONTEXT | STATE | REMOTE ACTION | RESULT |
|---|---|---|---|
| RECEIVED | RECORDINGS LIST FOLDER CONTENTS OVER RECEIVED VIDEO | ROTATE | MOVE UP/DOWN FOLDER CONTENTS LIST |
| | | HOLD LEFT | ROTATE TO LIST TYPE TO LEFT (SEARCH) |
| | | HOLD RIGHT | ROTATE TO LIST TYPE TO RIGHT (CHANNELS) |
| | | CLICK UP (MENU) | BACK TO RECORDINGS LIST |
| | | HOLD UP | DISMISS LIST |
| | | CLICK DOWN (PLAY/PAUSE) | PLAY ITEM |
| | | SELECT | GO TO ACTION MENU |

FIG. 47

| CONTEXT | STATE | REMOTE ACTION | RESULT |
|---|---|---|---|
| RECEIVED | SEARCH OVER RECEIVED VIDOE - FOCUS IN TEXT FIELD | ROTATE | ROTATE THROUGH ALPHABET LIST |
| | | CLICK LEFT | DELETE LAST LETTER |
| | | CLICK UP (MENU) | DISMISS SEARCH |
| | | CLICK DOWN (PLAY/PAUSE) | GO DOWN TO SEARCH RESULTS |
| | | SELECT | ENTER SELECTED CHARACTER INTO TEXT FIELD |

FIG. 48

| CONTEXT | STATE | REMOTE ACTION | RESULT |
|---|---|---|---|
| RECEIVED | SEARCH OVER RECEIVED VIDEO - FOCUS IN RESULTS LIST | ROTATE | MOVE UP/DOWN SEARCH RESULTS LIST |
| | | HOLD LEFT | ROTATE TO LIST TYPE TO LEFT (BROWSE) |
| | | HOLD RIGHT | ROTATE TO LIST TYPE TO RIGHT (RECORDINGS) |
| | | CLICK UP (MENU) | RETURN FOCUS TO SEARCH TEXT FIELD |
| | | HOLD UP | DISMISS SEARCH |
| | | CLICK DOWN (PLAY/PAUSE) | PLAY SEARCH ITEM IF PLAYABLE |
| | | SELECT | GO TO ACTION MENU FOR SINGLE MENU ITEM; ENTER FOLDER IF FOLDER MENU ITEM |

FIG. 49

| CONTEXT | STATE | REMOTE ACTION | RESULT |
|---|---|---|---|
| RECEIVED | BROWSE LIST OVER RECEIVED VIDEO | ROTATE | MOVE UP/DOWN BROWSE LIST |
| | | HOLD LEFT | ROTATE TO LIST TYPE TO LEFT (CHANNELS) |
| | | HOLD RIGHT | ROTATE TO LIST TYPE TO RIGHT (SEARCH) |
| | | CLICK UP (MENU) | DISMISS LIST |
| | | CLICK DOWN (PLAY/PAUSE) | PLAY ITEM IF PLAYABLE, OTHERWISE, N/A |
| | | SELECT | GO TO ACTION MENU FOR SINGLE MENU ITEM; ENTER FOLDER IF FOLDER MENU ITEM |

FIG. 50

| CONTEXT | STATE | REMOTE ACTION | RESULT |
|---|---|---|---|
| PLAYBACK | VIDEO PLAYBACK | ROTATE | TRANSPORT CONTROL |
| | | HOLD LEFT | BACK 10 SECONDS |
| | | HOLD RIGHT | FORWARD 30 SECONDS |
| | | CLICK UP (MENU) | ONSCREEN MENU |
| | | CLICK DOWN (PLAY/PAUSE) | PAUSE WITH INFO & TRANSPORT SHOWING |
| | | SELECT | SHOW INFO |

FIG. 51

MENU OVERLAY INCLUDING CONTEXT DEPENDENT MENU ICON

This application claims the benefit of the filing date of U.S. Provisional Application Ser. No. 60/825,234, filed on Sep. 11, 2006, and entitled "Media Controller Systems And Methods," the entire disclosure of which is incorporated herein by reference.

BACKGROUND

This disclosure is related to media processing systems and methods.

Media devices, such as digital video receivers and recorders, can include multiple functions and capabilities, such as recording and replaying stored content, and the like. Often content, browsing and selecting from recorded content and broadcast context, and the like. Often the large number of options and menus available to a user are not presented to the user in an intuitive manner. Additionally, the associated control devices, such as remote controls, often have many single-function and multi-function input keys. Such remotes often have many unintuitive key combinations and sequences that can be difficult for a user to invoke or remember. The lack of an intuitive user interface and a similarly uncomplicated control device are often a source of user frustration.

SUMMARY

Disclosed herein are systems and methods for generating a menu in a video environment for video that can be display in one or more contexts. In one example, the menu includes a menu overlay and a video is maintained within the menu overlay. For example, the video may be shown through a translucent menu overlay. One or more context dependent icons may be generated within the menu overlay.

In one example implementation, video can be displayed in one of a plurality of contexts in an onscreen display area. In response to the menu command, a menu overlay is generated within the onscreen display area while maintaining the video within the onscreen display, and one or more context icons based on the one of the plurality of contexts is generated within the menu overlay. In one example, the video is maintained within the onscreen display by maintaining the video within the menu overlay. For example, the menu overlay can be a translucent menu overlay.

In another example implementation, a video system includes a video input device, a data store, a handheld remote, and a processing device. The video input device receives video data, and the data store stores the video data. The handheld remote includes a rotational input to generate remote control signals. The processing device is in communication with the video input device, the data store and the handheld remote, and is configured to process and display video in one of a plurality of contexts in a video environment. In response to a first remote control signal received from the handheld remote, the processing device generates a menu overlay within the video environment while maintaining the video within the video environment and generates within the menu overlay a context icon based on the one of the plurality of contexts.

These and other implementations are described in detail below.

BRIEF DESCRIPTION OF THE DRAWINGS

FIG. 44 is an example state table for a channel list state in a received context.

FIG. 45 is an example state table for a channel list state in a received context.

FIG. 46 is an example state table for a first recordings list state to a received context.

FIG. 47 is an example state table for a second recordings lit state in a received context.

FIG. 48 is an example state table for a first search state in a received context.

FIG. 49 is an example state table for a second search state in a received context.

FIG. 50 is an example state table for a browse state in a received context.

FIG. 51 is an example state table for a playback state in a playback context.

DETAILED DESCRIPTION

Figure 1A:
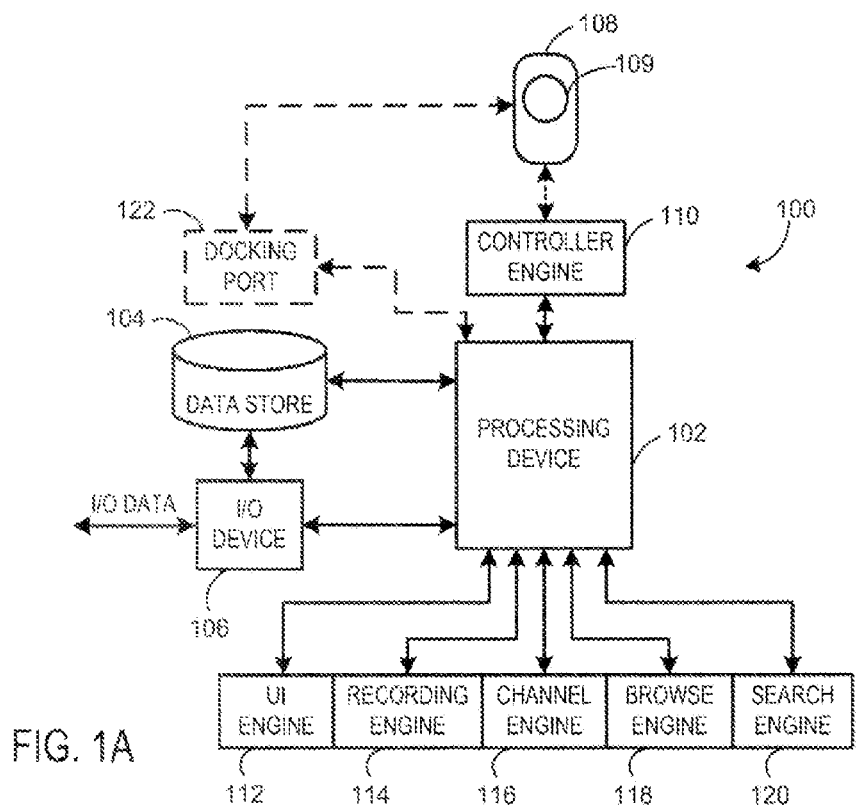
FIG. 1A is a block diagram of an example media processing system.

FIG. 1A is a block diagram of an example media processing system 100. The media processing system 100 can send and receive media data and data related to the media data. The media data can be processed in near real-time by a processing device 102 and stored in a data store 104, such as a memory device, for subsequent processing by the processing device 102.

In one implementation, the processing system 100 may be used to process, for example, audio data received over one or more networks by an input/output (I/O) device 106. Such audio data may include metadata, e.g., song information related to the audio data received.

In another implementation, the media processing system 100 may be used to process, for example, video data received over one or more networks by the I/O device 106. Such video data may include metadata, e.g., programming information related to the video data received. The video data and related metadata may be provided by a single provider, or may be provided by separate providers. In one implementation, the I/O device can be configured to receive video data from a first provider over a first network, such as a cable network, and receive metadata related to the video data from a second provider over a second network, such as a wide area network (WAN).

In another implementation, the media processing system 100 may be used to process both audio data and video data received over one or more networks by the I/O device 106. The audio data and video data can include corresponding metadata as described above.

The media processing system 100 can present the video data in one or more contexts, such as a received/broadcast context and a recording/playback context. Processing video data in the received/broadcast context can include processing broadcast video data that is either live, e.g., a sporting event, or pre-recorded, e.g., a television programming event. In the received context, the data store 104 may buffer the received video data. In one implementation, the video data can be buffered for the entire program. In another implementation, the video data can be buffered for a time period, e.g., twenty minutes. In another implementation, the data store 104 and the processing device 102 buffer the video data during user-initiated events, such as during a pause. Thus, when the user resumes normal viewing, the video data is processed from the pause time.

Processing video data in the recording/playback context can include processing, video data that is played back from a recording stored on the data store 104. In another implementation, processing video data in the playback context can include processing video data that is stored on a remote data store and received over a network, such as a cable network. In both playback implementations the media processing system 100 may perform playback processes such as play, pause, fast forward, rewind, etc.

In one implementation, the media processing system 100 includes a remote control device 108. The remote control 108 can include a rotational input device 109 configured to sense touch actuations and generate remote control signals therefrom. The touch actuations can include rotational actuations, such as when a user touches the rotational input device 109 with a digit and rotates the digit on the surface of the rotational input device 109. The touch actuations can also include click actuations, such as when a user presses on the rotational input device 109 with enough pressure to cause the remote control device 108 to sense a click actuation.

In one implementation, the functionality of the media processing system 100 is distributed across several engines. For example, the media processing system 100 may include a controller engine 110, a user interface (UI) engine 112, a recording engine 114, a channel engine 116, a browse engine 118, and a search engine 120. The engines may be implemented in software as software modules or instructions hardware, or in a combination of software and hardware.

The control engine 110 is configured to communicate with the remote control 108 by a link, such as a wireless infrared signal or radio frequency signal. The remote control 108 can transmit remote control signals generated from touch actuations of the rotational input device 109 to the control engine 110 over the link. In response, the control engine 110 is configured to receive the remote control signals and generate control signals in response. The control signals are provided to the processing device 102 for processing.

The control signals generated by the control engine 110 and processed by the processing device 102 may invoke one or more of the UI engine 112, recording engine 114, channel engine 116, browse engine 118, and search engine 120. In one implementation, the UI engine 112 manages a user interface to facilitate data presentation to a user and functional processing in response to user inputs for the recording engine 114, channel engine 116, browse engine 118 and search engine 120. For example, the UI engine 112 may manage perspective transactions of video data from a first presentation state, such as a full screen display of video, to a second presentation state, such as a perspective display of video. The UI engine 112 can also manage the generation of navigation menu items for population by the recording engine 114, channel engine 116, browse engine 118 and search engine 120. Processed media data, e.g., audio data and/or video data, can be provided to an output device, e.g., a television device, through the I/O device 106 or by a direct link, e.g., an S-video output, to the processing device 102. Example UI screenshots are shown in FIGS. 7-33 below.

In another implementation, the recording engine 114, channel engine 116, browse engine 118, and search engine 120 are controlled through the UI engine 112. Accordingly, the processing device 102 communicates control signals to the UI engine 112, which then selectively invokes one or more of the recording engine 114, channel engine 116, browse engine 118, and search engine 120. Other control architectures and functional allocations can also be used.

In one implementation, the recording engine 114 manages recording related functions, such as recording video data, playing back video data, and the like. The channel engine 116 manages channel selection related functions, such as generating channel menu items, generating previews, and the like. The search engine 120 manages search related functions, such as performing metadata searches and presenting the search results.

The media processing system 100 of FIG. 1 can also implement different functional distribution architectures that have additional functional blocks or fewer functional blocks. For example, the channel and recording engines 114 and 116 can be implemented in a single functional block, and the browse and search engine 118 and 120 can be implemented in another functional block. Alternatively, all of the engines can be implemented in a single monolithic functional block.

In one implementation, the media processing system 100 includes a docking port 122 that is configured to receive the remote control device 108. The remote control device 122 can include a rechargeable power system and thus be recharged while docked in the docking port 122. In another implementation, the docking port 122 can include a data communication channel, such as a universal serial bus (USB), and the remote control device 108 can include a data store and a display device. In this implementation, the remote control device 108 can store video programs downloaded from the media processing system 100. The stored video programs can later be played back and displayed on the display on the remote control device 108. For example, if a user of the media processing system 100 desires to view a recorded program at a remote location, e.g. while in flight during travel, the user may download the recorded program onto the remote control device 108 and take the remote control device 108 to the remote location for remote viewing.

Figure 1B:
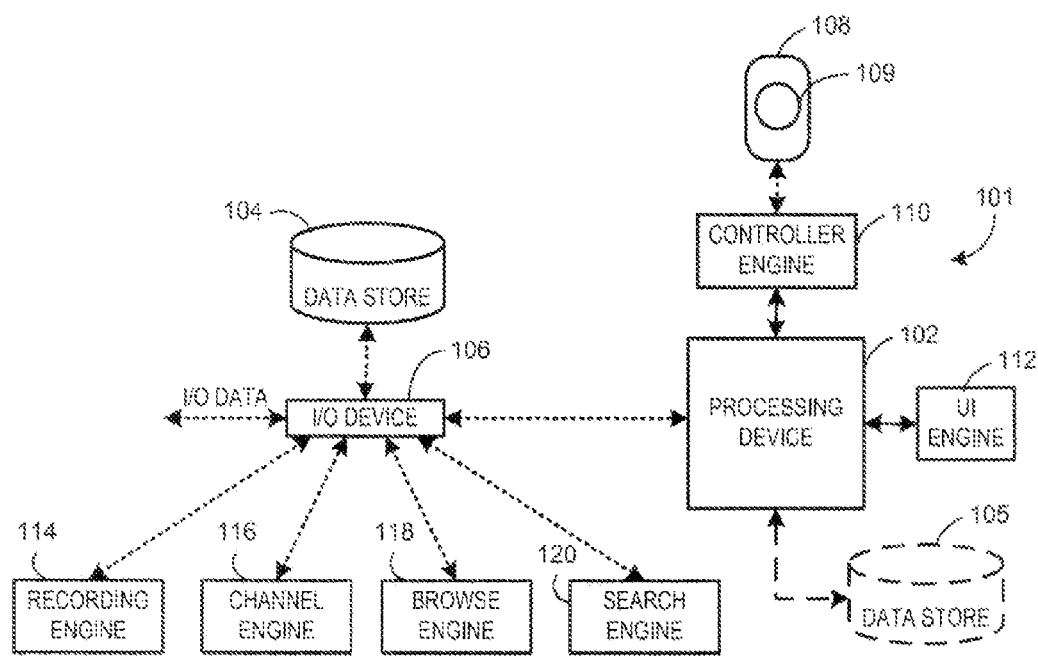
FIG. 1B is a block diagram of another example media processing system.

FIG. 1B is a block diagram of another example media processing system 101. In this example implementation, the processing device 102, data store 104, I/O device 106, recording engine 114, channel engine 116, browse engine 118 and search engine 120 communicate over a network, such as a wired or wireless network, e.g. an 802.11g network. The processing device 102, which can include the controller engine 110 and the UI engine 112 can, for example, be implemented as a wireless network device that can be positioned near an output device, such as a television. For example, the processing device 102, controller engine 110 and the UI engine 112 can be implemented in a hardware device that can be placed atop or next to a television device and connected to the television device by one or more data cables.

The I/O device 106 can receive media data, e.g., audio and/or video data, from a data source, e.g., a wide area network, such as the Internet, a cable modem, or satellite modem. The data store 104, recording engine 114, channel engine 116, browse engine 118 and search engine 120 can be implemented in one or more processing devices in wired or wireless communication with the I/O device. For example, a computing device can be used to implement the recording engine 114, channel engine 116, browse engine 118 and search engine 120, and the computing device may be conveniently located in a location remote from an entertainment center to reduce clutter. In this example implementation, the processing device 102 may also include a local data store 105 to buffer and/or store video and audio data received from the data store 104 or the I/O device 106. Furthermore, multiple hardware devices implementing the processing device 102, controller engine 110, and U/I engine 112 can be positioned near other output devices within communication range of the I/O device 106.

Other distribution architectures and schemes can also be used. For example, the processing device 102, data store 104 U/I engine 112, recording engine 114, channel engine 116, browse engine 118 and search engine 120 can be implemented in a first processing device, and the a second processing device that includes the data store 105 and the controller engine 110 can be positioned next to an output device, such as a television.

Figure 2:
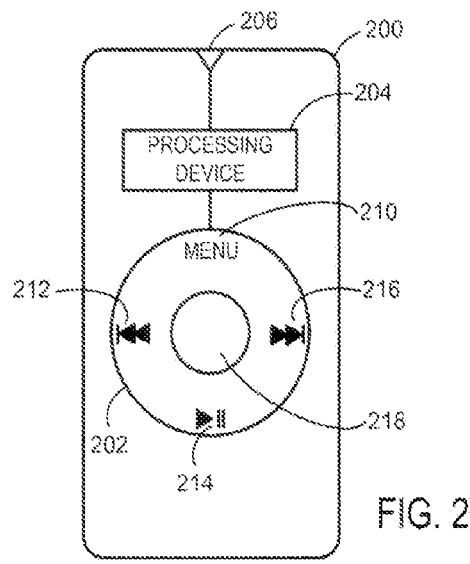
FIG. 2 is a block diagram of an example remote control device for a media processing system.

FIG. 2 is a block diagram of an example remote control device 200 for a media processing system. The remote control device 200 can be used to implement the remote control 108 of FIG. 1A or 1B. The remote control device 200 includes a rotational input device 202, a processing device 204, and a wireless communication subsystem 206. The rotational input device 202 defines a surface that can sense a touch actuation, such as the presence of a finger on the surface, and can further generate a control signal based on a rotation of the finger on the surface. In one implementation, a touch sensitive array is disposed beneath the surface of the rotational input device 202. The touch sensitive array can be disposed according to polar coordinates, i.e., r and $\Theta$, or can be disposed according to Cartesian coordinates, i.e. x and y.

The surface 202 can also include areas 210, 212, 214, 216 and 218 that are receptive to press actuations. In one implementation, the areas include a menu area 210, a reverse/previous area 212, a play/pause area 214, a forward/next area 216, and a select area 218. The areas 210, 212, 214, 216 and 218, in addition to generating signals related to their descriptive functionality, can also generate signals to support the functionality of dismissing an onscreen user interface, and the play/pause area 214 can generate signals to support the function of drilling down into a hierarchal user interface. In one implementation, the areas 210, 212, 214, 216 and 218 comprise buttons disposed beneath the surface of the rotational input device 202. In another implementation, the areas 210, 212, 214, 216 and 218 comprise pressure sensitive actuators disposed beneath the surface of the rotational input device 202.

A processing device 204 is configured to receive the signals generated by the rotational input device 202 and generate corresponding remote control signals in response. The remote control signals can be provided to the communication subsystem 206, which can wirelessly transmit the remote control signals to the media processing system 100.

Although shown as comprising a circular surface, in another implementation, the rotational input device 202 can comprise a rectangular surface, a square surface, or some other shaped surface. Other surface geometries that accommodate pressure sensitive area and that can sense touch actuations may also be used, e.g., an oblong area, an octagon area, etc.

Figure 3:
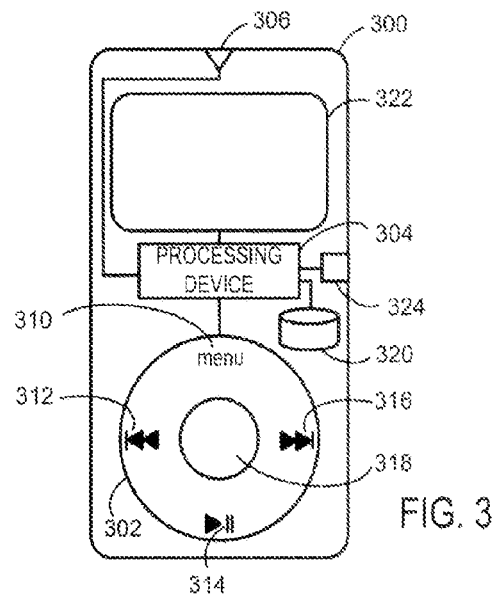
FIG. 3 is a block diagram of another example remote control device for a media processing system.

FIG. 3 is a block diagram of another example remote control device 300 for a media processing system. The remote control device 300 can be used to implement the remote control 108 of FIG. 1A or 1B. The elements 302, 304, 306, 310, 312, 314, 316 and 318 of the remote control device 300 is similar to the elements 202, 204, 206, 210, 212, 214, 216 and 218 of the remote control device 200. The control device 300 also includes a data store 320, a display device 322, and an audio device 324. In one implementation, the data store comprises a hard drive, the display device 322 comprises a liquid crystal (LCD) display, and the audio device 324 comprises audio I/O subsystem including an output jack for a hearing device. Other data store devices, display devices, and audio devices may also be used.

The remote control device 300 provides the same functionality as the remote control device 200, and also provides additional functionality by use of the data store 320, the display device 322, and the audio device 324. For example, the remote control device 300 can display program information on the display device 322 for a television program that is currently being received by the media processing system 100, or can display recording information on the display device 322 for a recording that is currently being played back by the media processing system 100. Thus, a user can conveniently glance at the remote control device 300 to review the program information rather than activate an on-screen information overlay. The remote control device 300 can also provide additional functionality, such as providing portable media player processing functions.

Figure 4:
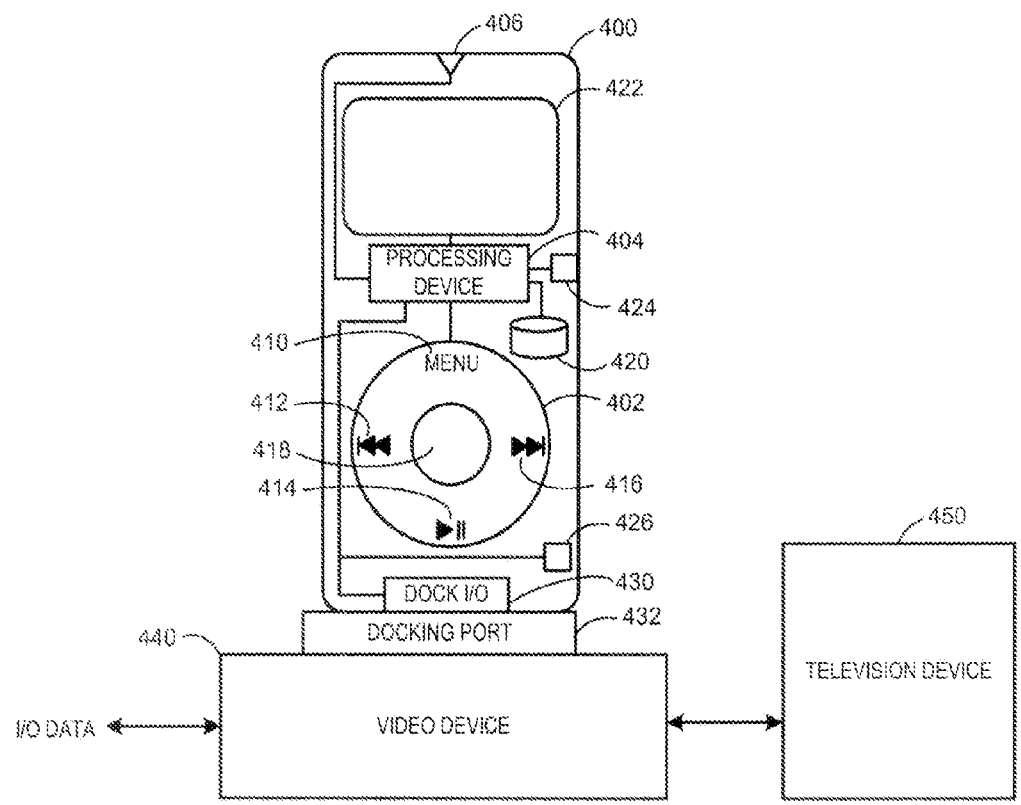
FIG. 4 is a block diagram of an example remote control device for a video processing system having a docking port.

FIG. 4 is a block diagram of an example remote control device 400 for a media processing system 100 having a docking port 432. The remote control device 400 can be used to implement the remote control 108 of FIG. 1A or 1B. The elements 402, 404, 406, 410, 412, 414, 416, 418, 420, and 422 of the remote control device 400 are similar to the elements 302, 304, 306, 310, 312, 314, 316, 318, 320, and 322 of the remote control device 300. The remote control device 400 also includes a rechargeable power device 426 and a dock I/O device 430. The dock I/O device 430 is configured to be received by the docking port 432 on a video device 440. The video device 440 can perform the described functionality of the media processing systems 100 or 101 of FIG. 1A or 1B, and display video data on an output device, such as a television 450.

The dock I/O device 430 and docking port 432 can include a data coupling and can optionally include a power coupling. The rechargeable power system 426 can be recharged while the remote control device 400 is docked in the docking port 432. The remote control device 400 can store video programs and/or audio files downloaded from the video device 440. The stored video programs and audio files can later be played back and displayed on the display 422 and/or listened to through use of the audio device 424.

In one implementation, the remote control device 400 can provide the functionality of the UI engine 112, recording engine 114, channel engine 116, browse engine 118, and search engine 120. For example, program data for upcoming programs, e.g., for the next months, can be downloaded and stored on the remote control device 400. Thereafter, a user of the remote control device 400 can search programs that are to be broadcast and determine which programs to record. The recording settings can be programmed onto the remote control device 400, and then be provided to the video device 440 when a data communication is established between the remote control device 400 and the video device 440. The data communication may be established through the wireless communication subsystem 406 or the dock I/O device 430 and docking port 432. Thereafter, the specified programs are recorded by the video device 440. For example, a user may download programming data for the next four weeks, and while at a remote location determine what programs to record, e.g., during a commute on a train. Thus, when the user arrives home, the user can place the remote control device 400 within the vicinity of the video device 440 or within the docking port 432, and the recording data is downloaded into the video device 440. Thereafter the specified programs are recorded.

Figure 5:
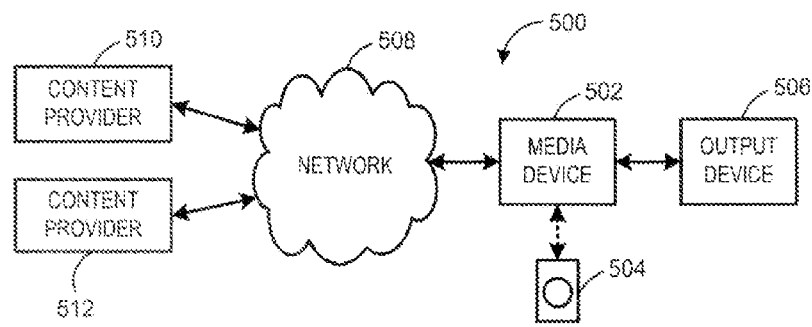
FIG. 5 is an example network environment 500 in which a media processing system in accordance with FIG. 1 may be implemented.

FIG. 5 is an example network environment 500 in which a media processing system in accordance with FIG. 1A or 1B may be implemented. A media device 502, such as the media processing system 100, receives user input through a remote device 504, such as the remote 108, and processes media data for output on an output device 506. In one implementation, the media device 502 is a video device, and the media data is video data. The media data is received through a network 508. The network 508 may include one or more wired and wireless networks. The media data is provided by a content provider 510. In one implementation, the media data may be provided from several content providers 510 and 512. For example, the content provider 510 may provide media data that is processed and output through the output device 506, and the content provider 512 may provide metadata related to the media data and for processing by the media device 502. Such metadata may include broadcast times, artist information, and the like.

In one implementation, the media data is video data and the metadata is video programming information, such as broadcast times, cast members, program trivia, and the like. A set of video data can thus be identified as a video event, e.g., a series episode broadcast, a sporting event broadcast, a news program broadcast, etc. The video events can be presented to the user through event listings, e.g., menu items listing programming information, channels and times.

Figure 6:
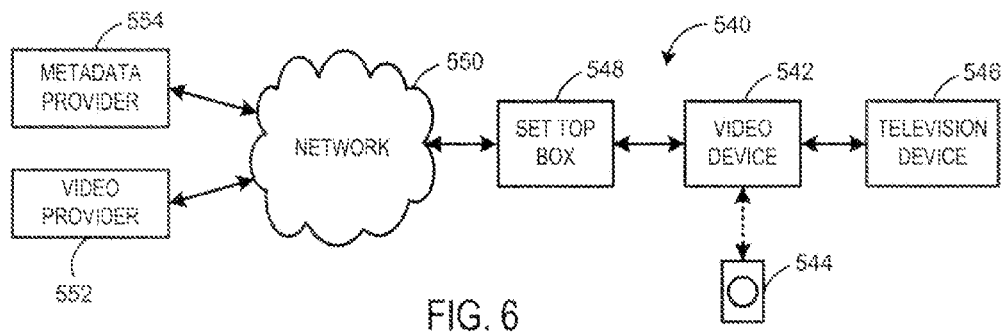
FIG. 6 is another example network environment in which a video processing system in accordance with the system of FIG. 1 may be implemented.

FIG. 6 is another example network environment 540 in which a video processing system in according with the system of FIG. 1A or 1B may be implemented. A video device 542, such as the media processing system 100, receives user input through a remote control device 544, such as remote control device 108, and processes video data for output on a television device 546. Video data and associated metadata are received by a set top box 548 through a network 550 from a video provider 552 and a metadata provider 554. The video device 542 is configured to communicate with the set top box 548 and a metadata provider 554. The video device 542 is configured to communicate with the set top box 548 to receive video data and the associated metadata. The set top box 548 can be a digital cable processing box provided by a digital cable provider, e.g., video provider 552 and/or metadata provider 554.

Figure 7:
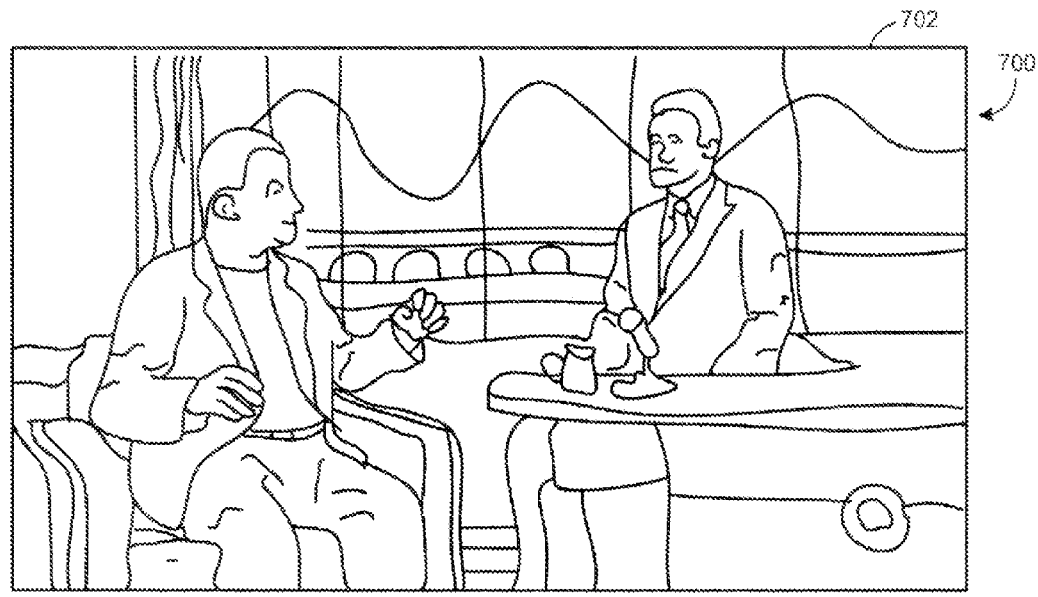
FIG. 7 is a screenshot of video data displayed in a video environment.

FIG. 7 is a screenshot 700 of video data displayed in a video environment 702. The screenshot 700 can be generated, for example, by the processing device 102 and the UI engine 112 of FIG. 1A or 1B. The video environment 702 can include the full-screen display of video data that is either received from a broadcast in a received context or played back from a recording in a playback context. The video environment 702 thus is a normal view context. The screenshot 700 shows a single frame of video data from a television broadcast.

Figure 8:
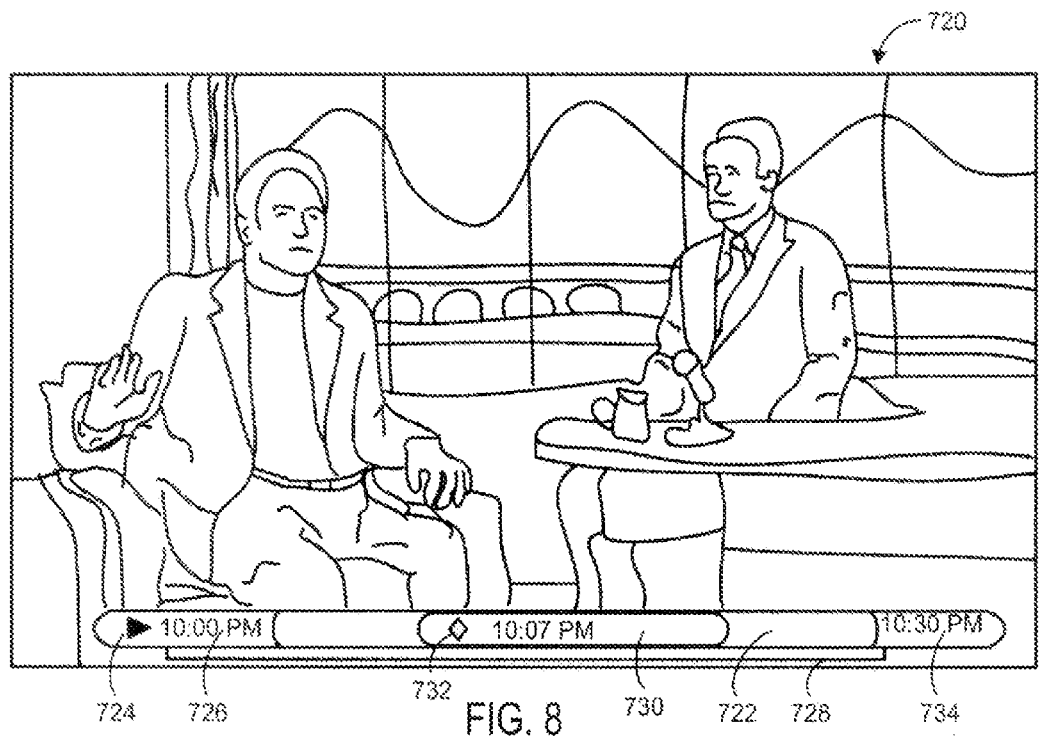
FIG. 8 is a screenshot of video data including an example transport bar.

FIG. 8 is a screenshot 720 of video data including an example transport bar 722. The screenshot 720 can be generated, for example, by the processing device 102 and the UI engine 112 of FIG. 1A or 1B. A state indicator 724 indicates the state of video processing (e.g. playing/receiving, fast forward, reverse, etc.). A first time field 726 indicates the time that the displayed program began. In one implementation, the time indicator indicates the time a broadcast began for broadcast programs, and indicates a default time (e.g. 00:00:00) for recorded programs or recordings.

A duration bar 728 represents the full length of a television program or recording. A buffer bar 730 represents the amount of the program stored in a buffer for television programs received during a received state. In one implementation, the buffer bar 730 expands to encompass the duration bar 728 for recorded programs when displayed in a playback state, as the entire duration of the program is recorded. A position indicator 732 represents the current asset time, e.g., the time that the currently displayed video data was broadcast or a time index in a recording. A second time field 734 represents the time a program is scheduled to end for a broadcast in a received context, or the duration of a recording in a recording/playback context.

In one implementation, the transport bar 722 is generated by pressing the play/pause area on the remote control device 108, which causes the video to pause.

Figure 9:
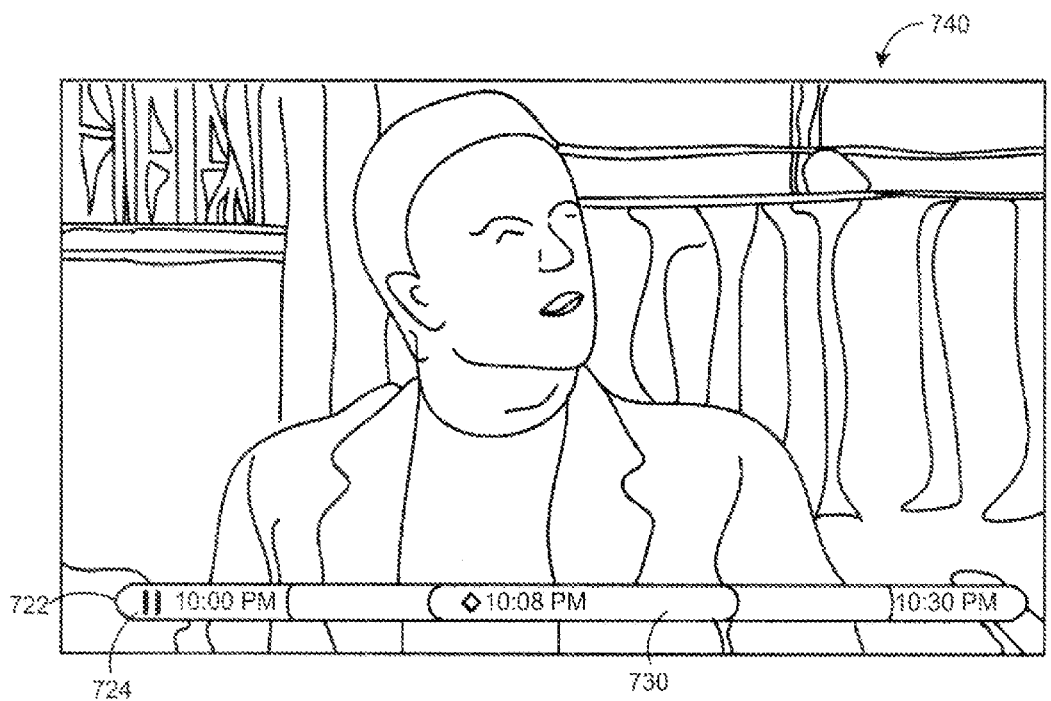
FIG. 9 is a screenshot of video data that is in a paused mode.

FIG. 9 is a screenshot 740 of video data that is in a paused mode. The screenshot 740 can be generated, for example, by the processing device 102 and the UI engine 112 of FIG. 1A or 1B. The state indicator 724 in the transport bar 722 is a paused symbol. In the received context, the buffer bar 730 will expand to the right as a data store continues to buffer received video data while paused.

Figure 10:
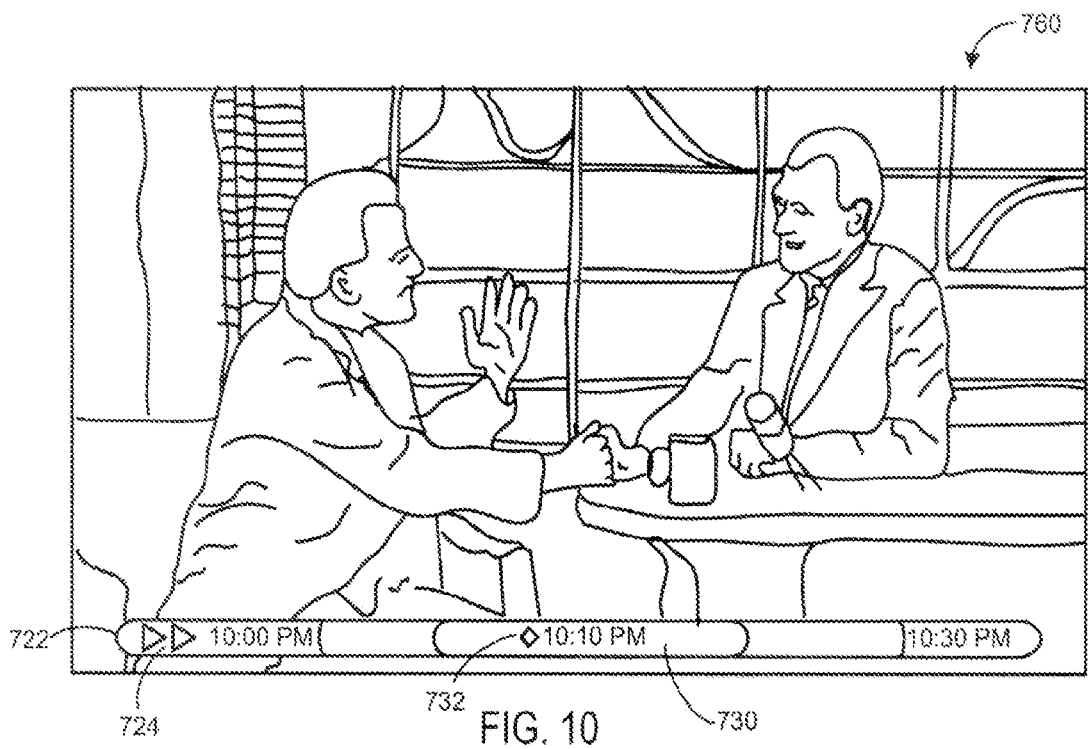
FIG. 10 is a screenshot of video data that is in a forward scrubbing mode.

FIG. 10 is a screenshot 760 of video data that is in a forward scrubbing mode. The screenshot 760 can be generated, for example, by the processing device 102 and the UI engine 112 of FIG. 1A or 1B. The state indicator 724 in the transport bar 722 shows a fast forward symbol. In the received context, the position indicator 732 advances within the buffer bar 730 during forward scrubbing when the video data is being processed at a rate that is faster than the rate at which the video data is being received, e.g., 2×, 4×, etc.

In one implementation, the forward scrubbing state is invoked by pressing the forward area on the remote control device 108, and the video data advances at one of a plurality of fixed rates, e.g., ½×, 2×, 4×, etc. In one implementation, the fixed rates may be selected by repeatedly pressing the forward area on the remote control device.

In another implementation, providing a rotational input on the rotational input device (e.g., moving a fingertip on the surface of the rotational input device in a circular motion) of the remote control device 108 causes the video processing device to access the stored video data at a rate substantially proportional to the rate of the rotational input. The rate may be proportioned according to a functional relationship, such as a function of the rate of a rotational actuation. The functional relationship may be linear or non-linear. For example, a slow rotation can scrub the video data slowly, e.g., advance frame-by-frame, while a fast rotation will scrub much more quickly. In one implementation, the scrub rate is nonlinear in proportion to the rotation rate. For example, the scrub rate may be exponentially proportional to the rate of the rotational input, or logarithmically proportional to the rotational input. In one implementation, a clockwise rotation causes the video data to be scrubbed forward, and a counterclockwise rotation causes the video data to be scrubbed in reverse.

In another implementation, a rotational input is determined by an angular deflection from a reference position. For example, if a stationary touch actuation exceeds an amount of time, e.g., five seconds, then the position of the finger on the rotational input is stored as a reference position. Thereafter, rotation of the finger away from the reference point generates a rotation signal that is proportional to the amount of angular deflection. For example, a rotation of less than 10 degrees can generate a frame-by-frame advancement or reverse; a rotation of 10 degrees to 20 degrees can generate a 1× advancement or reverse; a rotation of 20 degrees to 30 degrees can generate a 2× advancement or reverse; etc. Other proportional relationships can also be used, e.g. a linear or non-linear proportionality with respect to the angular displacement.

Figure 11:
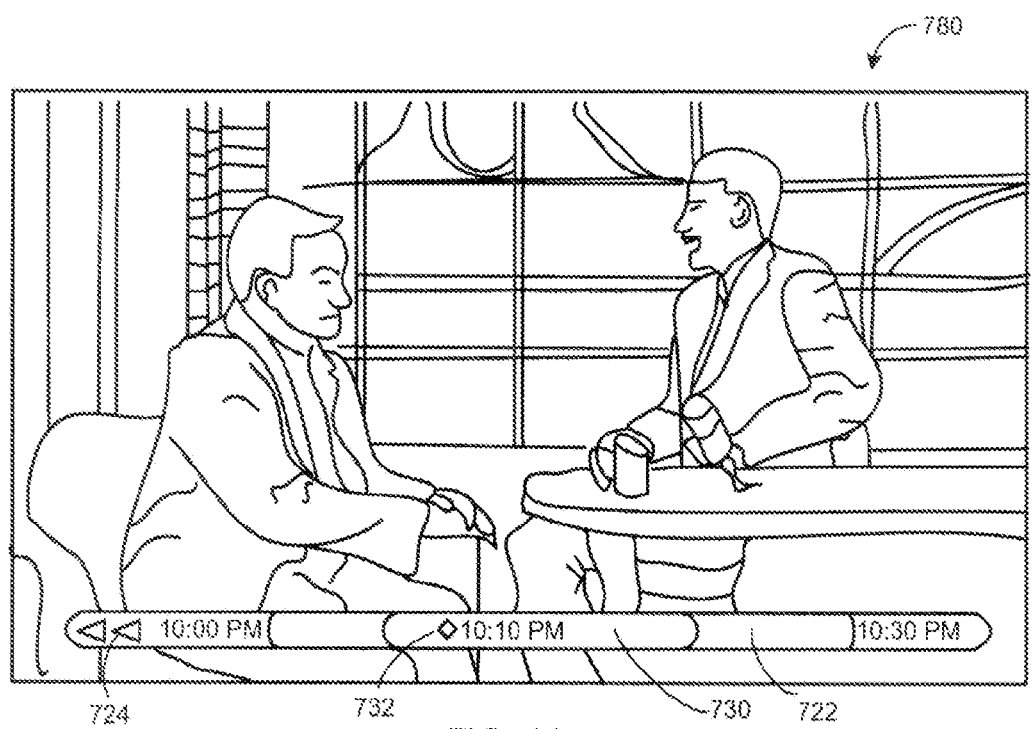
FIG. 11 is a screenshot of video data that is in a reverse scrubbing mode.

FIG. 11 is a screenshot 780 of video data that is in reverse scrubbing mode. The screenshot 780 can be generated, for example, by the processing device 102 and the UI engine 112 of FIG. 1A or 1B. The state indicator 724 in the transport bar 722 is a reverse symbol. In the received context, the position indicator 732 retreats within the buffer bar 730 during the reverse state.

In one implementation, the reverse state is invoked by pressing the reverse area on the remote control device 108, and the video data is processed in reverse at one of a plurality of fixed rates, e.g., ½, 2×, 4×, etc. The fixed rates may be selected by repeatedly pressing the reverse area on the remote control device.

Figure 12:
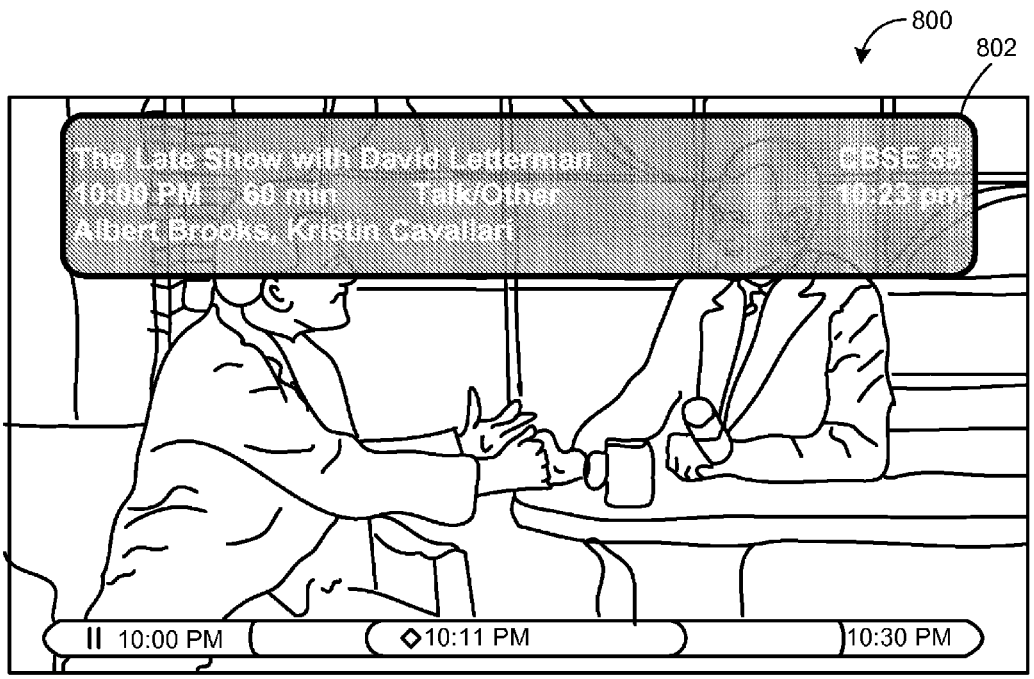
FIG. 12 is a screenshot of a video data including an example information overlay.

FIG. 12 is a screenshot 800 of video data including an example information overlay 802. The screenshot 800 can be generated for example, by the processing device 102 and the UI engine 112 of FIG. 1A or 1B. The information overlay 802 provides information regarding the video data currently being viewed in the received context or the playback context. In one implementation, the information overlay 802 is invoked by pressing the select area of the rotational input device on the remote control device 108. In one implementation, the information overlay 802 fades out after a time period, e.g., 15 seconds.

Figure 13:
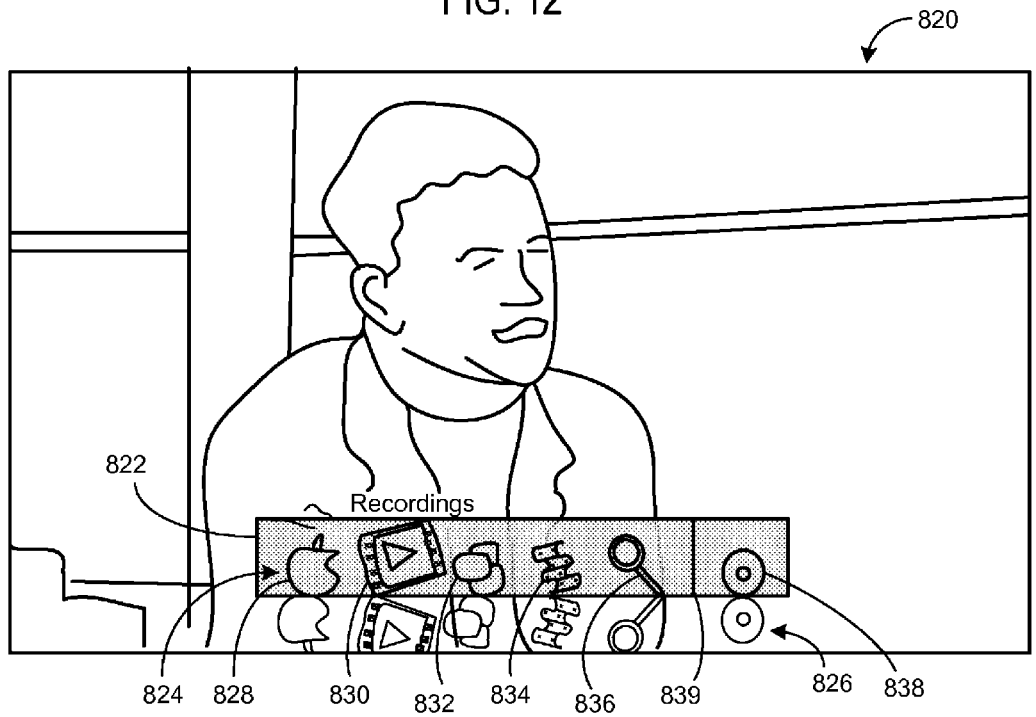
FIG. 13 is a screenshot of video data including an example menu overlay.

FIG. 13 is a screenshot 820 of video data including an example menu overlay 822. The screenshot 820 can be generated, for example, by the processing device 102 and the UI engine 112 of FIG. 1A or 1B. In one implementation, the menu overlay 822 defines a translucent region through which the video data can be maintained. A plurality of icons 824 can be generated in the menu overlay 822. In one implementation, icon reflections 826 are also generated within the menu overlay. The menu overlay 822 can be generated by pressing the menu area on the rotational input device 109 of the remote control device 108.

In one implementation, the icons include a home icon 828, a recordings navigation icon 830, a channels navigation icon 832, a browse navigation icon 834, and a search navigation icon 836. Additionally, one or more context-dependent icons may also be generated within the menu overlay. For example, a record icon 838 can be generated in the received context to allow a user to record video data that is presently being received. In one implementation, the menu overlay 822 may also delimit context-dependent icons. For example, a bar 839 delimits the record icon 830 from the navigation icons 830, 832, 834 and 836.

Highlighting an icon can be indicated by enlarging the size of the icon and generating a textual description atop the enlarged icon. For example, the recordings icon 830 is highlighted in FIG. 13. In one implementation, each icon 824 may be highlighted by use of the rotational input device 109 on the remote control device 108 to highlight icons in a right-to-left or left-to-right manner.

Pressing the select area on the rotational input device 109 on the remote control device 108 can select the icon to instantiate a related process. For example, a selection of the home icon 828 can exit a video processing environment and return a user to a computing environment or multimedia processing environment if the video processing device is implemented in a personal computer device. Selection of the recordings navigation icon 830 can generate a recordings navigation menu populated by recording menu items. Selection of the channels navigation icon 832 can generate a channels navigation menu populated by channel menu items. Selection of the browse navigation icon 834 can generate a browse navigation menu populated by playlist items. Selection of the search navigation icon 836 can generate a search navigation menu.

Figure 14:
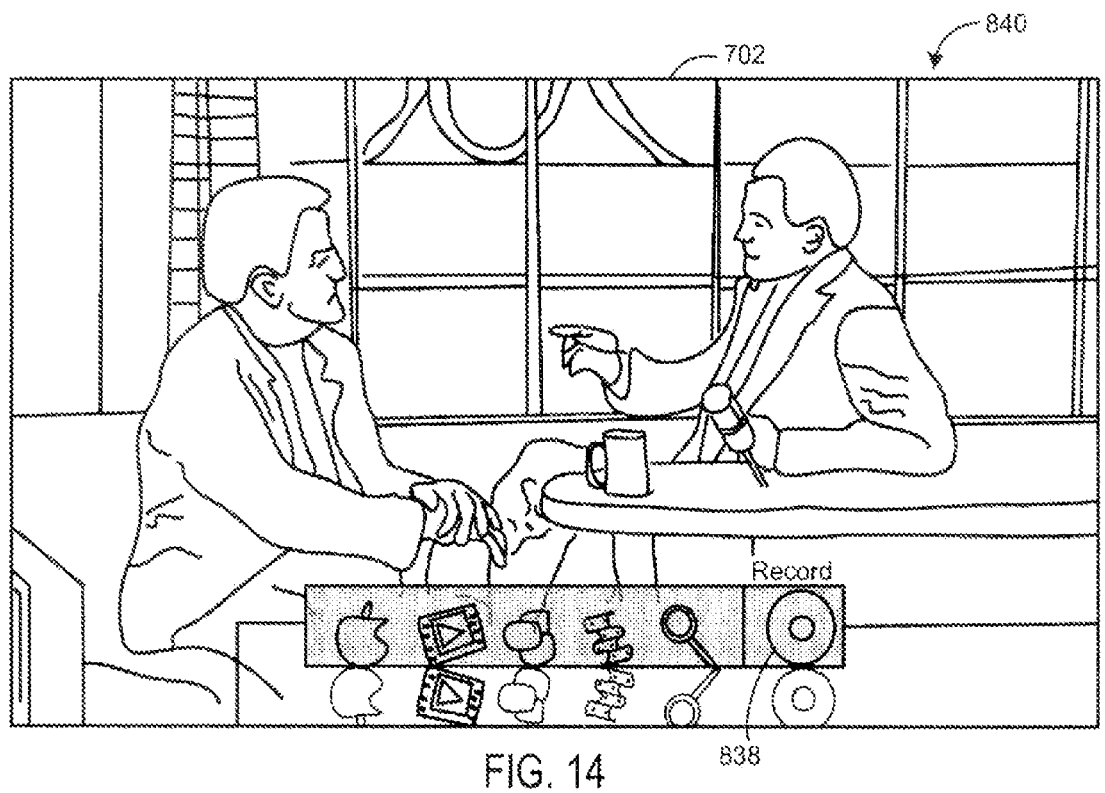
FIG. 14 is a screenshot of video data including a record icon.

FIG. 14 is a screenshot 840 of video data including the record icon 838. The screenshot 840 can be generated, for example, by the processing device 102 and the UI engine 112 of FIG. 1A or 1B. In FIG. 13, the video data displayed in the video environment is a received broadcast, and thus the video data is displayed in a received context. Accordingly, the context-dependent icon generated is the record icon 838. The context-dependent icon may also change as the result of selection. For example, if the highlighted record icon 838 is selected, the record icon 838 may be replaced by a "Stop" icon to stop recording.

Figure 15:
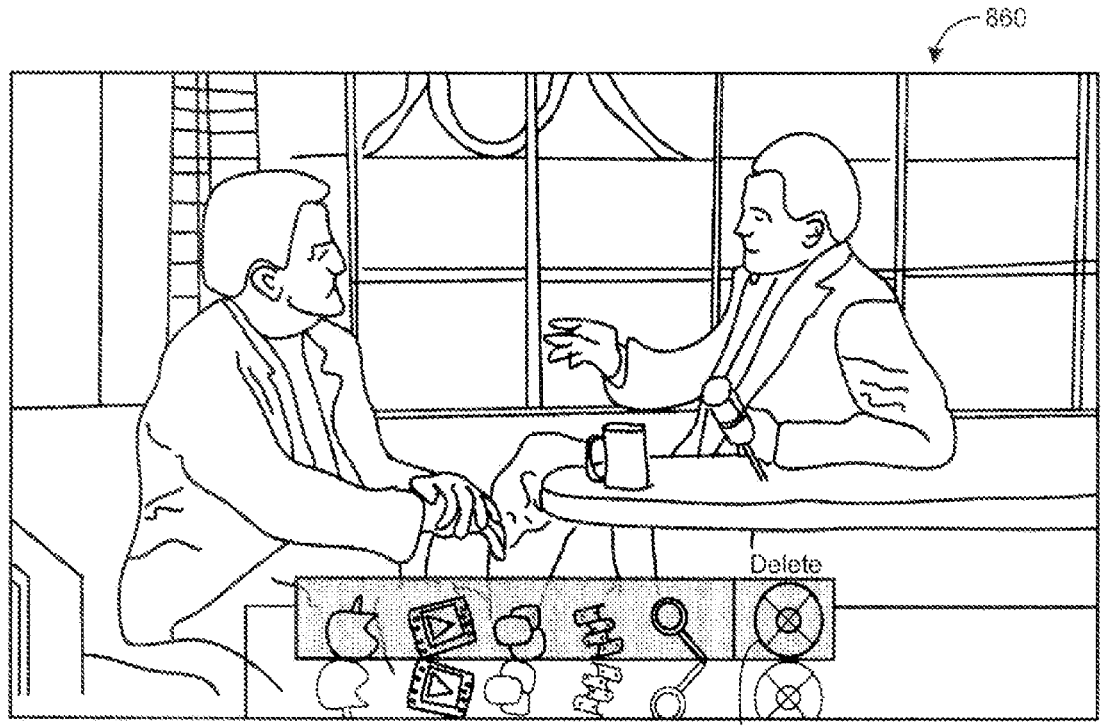
FIG. 15 is a screenshot of video data including a delete icon.

FIG. 15 is a screenshot 860 of video data including a delete icon 862. The screenshot 860 can be generated, for example, by the processing device 102 and the UI engine 112 of FIG. 1A or 1B. In FIG. 13, the video data displayed in the video environment is a playback of a recorded program, and thus the video data is displayed in a playback context. Accordingly, the context-dependent icon generated is the delete icon 862, the selection of which will delete from memory the recorded program currently being displayed in the video environment 702.

Figure 16:
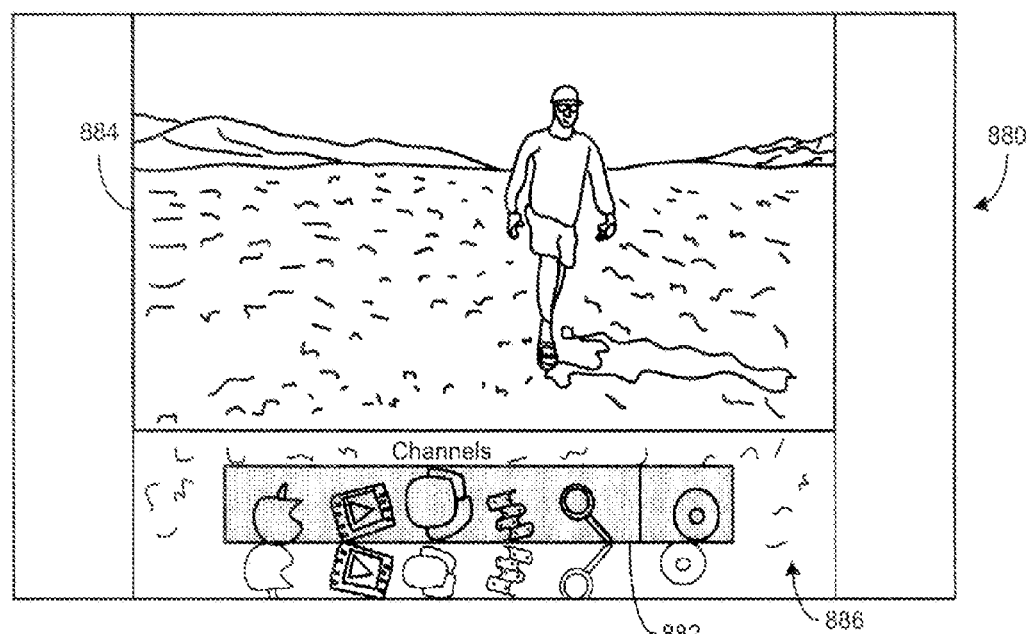
FIG. 16 is a screenshot of video data including another example menu overlay.

FIG. 16 is a screenshot 880 of video data including another example menu overlay 882. The screenshot 880 can be generated, for example, by the processing device 102 and the UI engine 112 of FIG. 1A or 1B. In this implementation, the video data is displayed in another video environment 884 that is a scaled version (e.g., substantially linearly scaled) of the video environment 702, and defines a space 886 in which the menu overlay 882 is displayed. The video environment 884 may be generated by a transition from video environment 702, e.g., a fixed-scale shrinking of the video from the video environment 702 to the video environment 884 over a relatively short time period, e.g., one second. In one implementation, a reflection of the video environment 884 may be shown in the space 886. In all other aspects the menu overlay 882 and icon functions are the same as described with respect to FIG. 13.

Figure 17A:
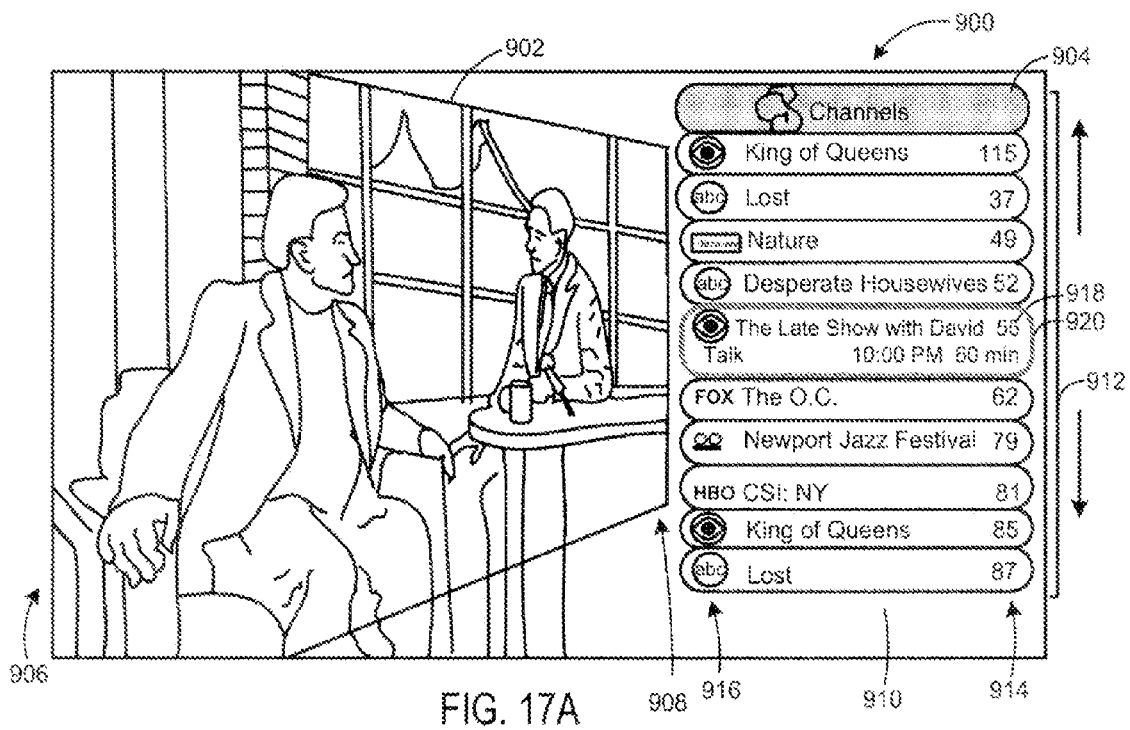
FIG. 17A is a screenshot of video data displayed in a video environment and including an example channel navigation menu.

FIG. 17A is a screenshot 900 of video data displayed in a video environment 902 and including an example channel navigation menu 904. The screenshot 900 can be generated, for example, by the processing device 102, the UI engine 112, and the channel engine 116 of FIG. 1A or 1B. The channel navigation menu 904 can be generated, for example, by selecting the channels icon 832 in the menu overlay 822. In this implementation, the video environment 902 is a perspective scale of the video environment 702 and can be generated by a perspective transition from the video environment 702 to the video environment 902. For example, the UI engine 112 may render the video data so that it appears that the video image rotates on an axis defined by, for example, the left side 906 of the video environment, which causes the right side 908 of the video environment 902 to rotate in depth and define a space 910. The video environment 902 is thus a perspective view context.

In one implementation, the channels menu 904 can be generated to a similar manner. For example, the channel menu items 912 may appear to rotate on an axis defined by the right side 914 of the menu items 912, which causes the left side 916 of the channel menu items 912 to rotate into the space 910.

Figure 18:
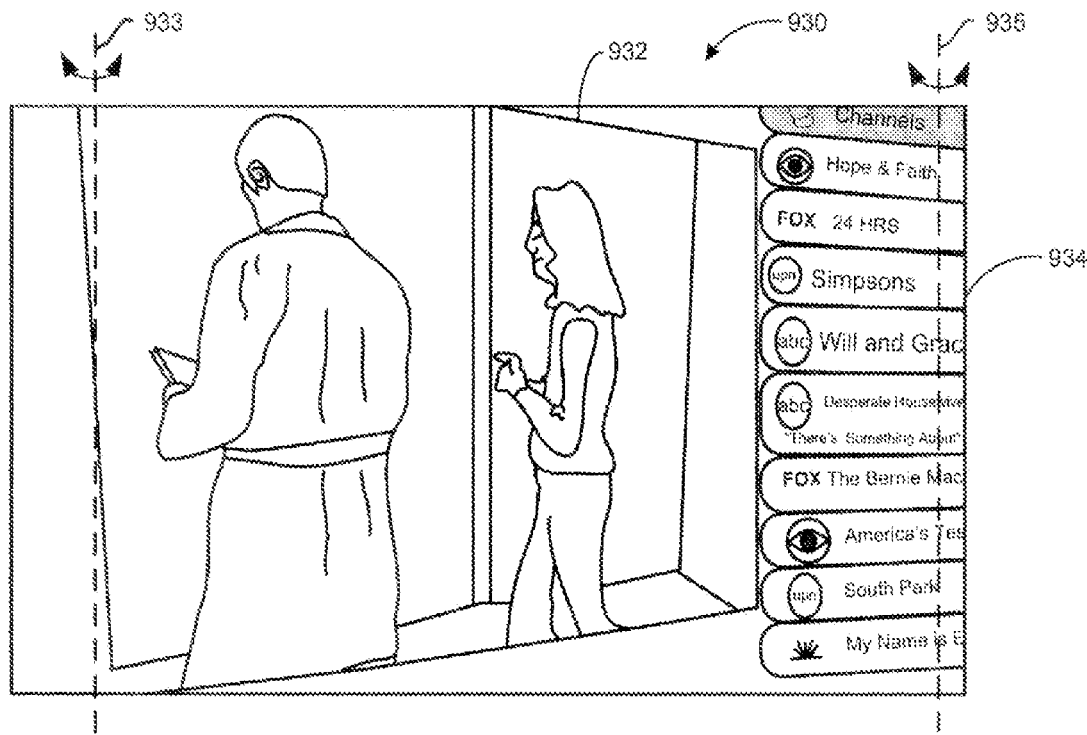
FIG. 18 is a screenshot of an example perspective transition of video data between a perspective video environment and a full screen video environment.

FIG. 18 is a screenshot 930 of another example perspective transition 932 of video data between a perspective video environment 902 and full screen video environment 702. The screenshot 930 can be generated, for example, by the processing device 102, the UI engine 112, and the channel engine 116 of FIG. 1A or 1B. The video data in the video environment 932 is rendered to appear to rotate about an approximate axis 933. Likewise, the navigation menu 934 is rendered to appear to rotate about an approximate axis 935. Other processes to generate the video environment 902 and the channels menu 904 may also be used.

Figure 17B:
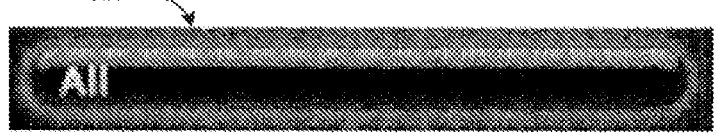
FIG. 17B is a screenshot of a highlighted item.

Each channel menu item 912 shown in FIG. 17A can include a program title and channel. In one implementation, a highlighted channel menu item 918 includes additional information, such as a program category (e.g., talk, drama, news, etc.), a program start time, and a program duration. The highlighted channel menu item 918 can also include a glow highlight 920. In one implementation, the glow highlight 920 provides the appearance of a backlit surface beneath the channel menu item, as shown in FIG. 17B.

A highlight selection of a channel menu item indicates that the channel menu item is eligible for a further selection action, e.g., eligible to be selected by actuating the select area on the rotational input device 109. Upon the further selection, a process associated with the highlighted menu item is performed, e.g., changing a channel.

In one implementation, a rotational input to the rotational input device 109 or the remote control device 108 causes the channel menu items 912 to scroll up or down. For example, a clockwise rotational input causes the channel menu items 912 to scroll down, and a counterclockwise rotational input causes the channel menu items to scroll up. In one implementation, the channel menu item 918 near the center of the space 910 is highlighted; thus, as the channel menu items move up or down, the highlighted channel menu item 918 changes to a different channel menu item for selection.

Figure 19:
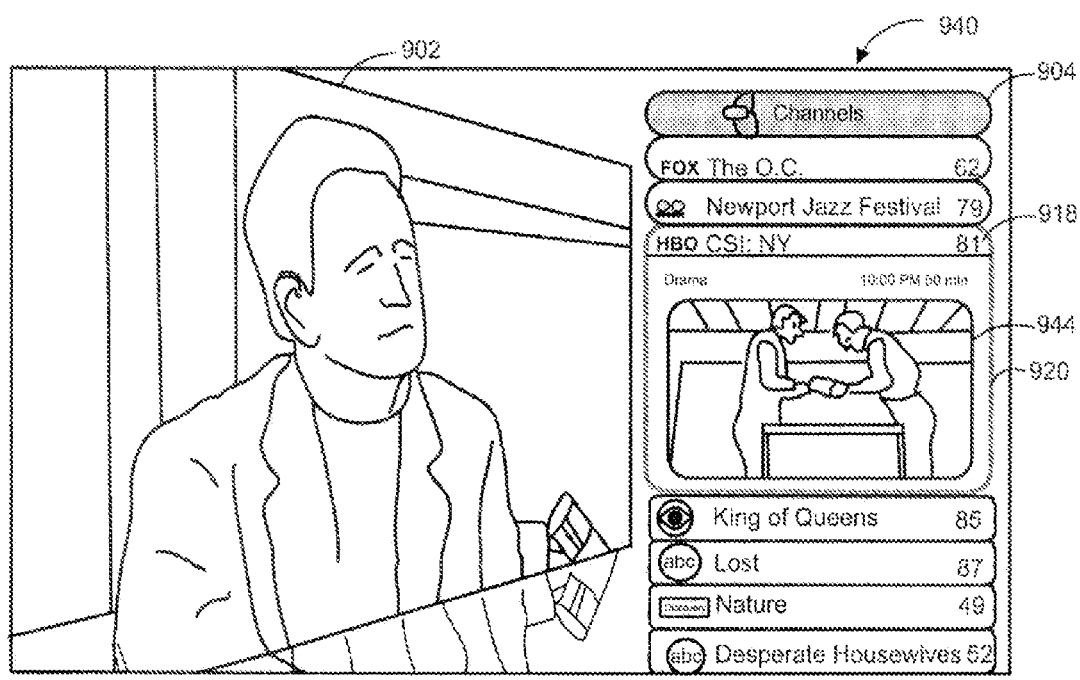
FIG. 19 is a screenshot of video data including an example video preview.

FIG. 19 is a screenshot 940 of video data including an example video preview 944. The screenshot 940 can be generated, for example, by the processing device 102, the UI engine 112, and the channel engine 116 of FIG. 1A or 1B. In one implementation, the video preview 944 is generated after the channel menu item 918 remains highlighted for a period of time, e.g., several seconds. In another implementation, the video preview 944 is generated after the channel menu item 918 is highlighted and at the cessation of a touch actuation (e.g., the lifting of a finger off the rotational input device 109 of the remote control device 108). The video preview 944 can be generated, for example, by expanding the channel menu item 918 vertically. In the received/broadcast context, the video preview 944 can include the video data of the program currently being broadcast on the channel corresponding to the highlighted channel menu item 918. In one implementation, if the channel corresponding to the highlighted channel menu item 918 is the same as the channel being presented in the video environment 902, then a preview 944 is not generated.

Figure 20:
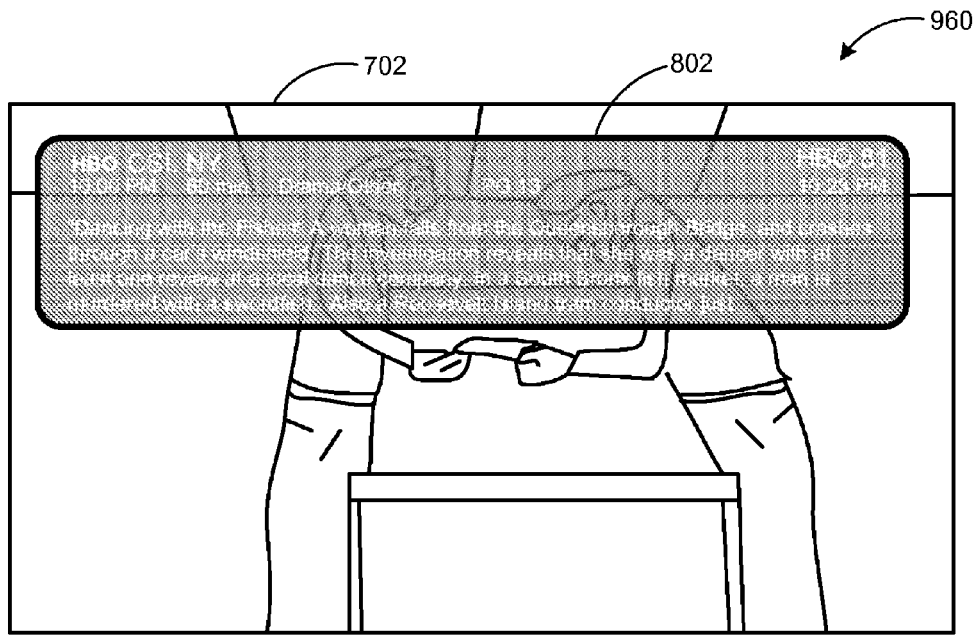
FIG. 20 is a screenshot of video data resulting from a selection of a channel menu item.

Pressing the select area on the rotational input of the remote control device 108 changes the channel to the channel corresponding to the highlighted channel menu item 918. FIG. 20 is a screenshot 960 of video data resulting from a selection of a channel menu item 918 of FIG. 19. The screenshot 960 can be generated, for example, by the processing device 102, the UI engine 112, and the channel engine 116 of FIG. 1A or 1B. In this implementation, when a channel menu item is selected, presentation of the video data reverts to a full-screen video environment 702 with an initial information overlay 802. The information overlay 802 can fade after a time period.

In another implementation, presentation of the video data remains in the perspective video environment 902 when a channel menu item is selected. The presentation may be changed back to the full screen video environment 702 upon a user selection, e.g., pressing the menu area on the rotational input of the remote control device 108.

Figure 21:
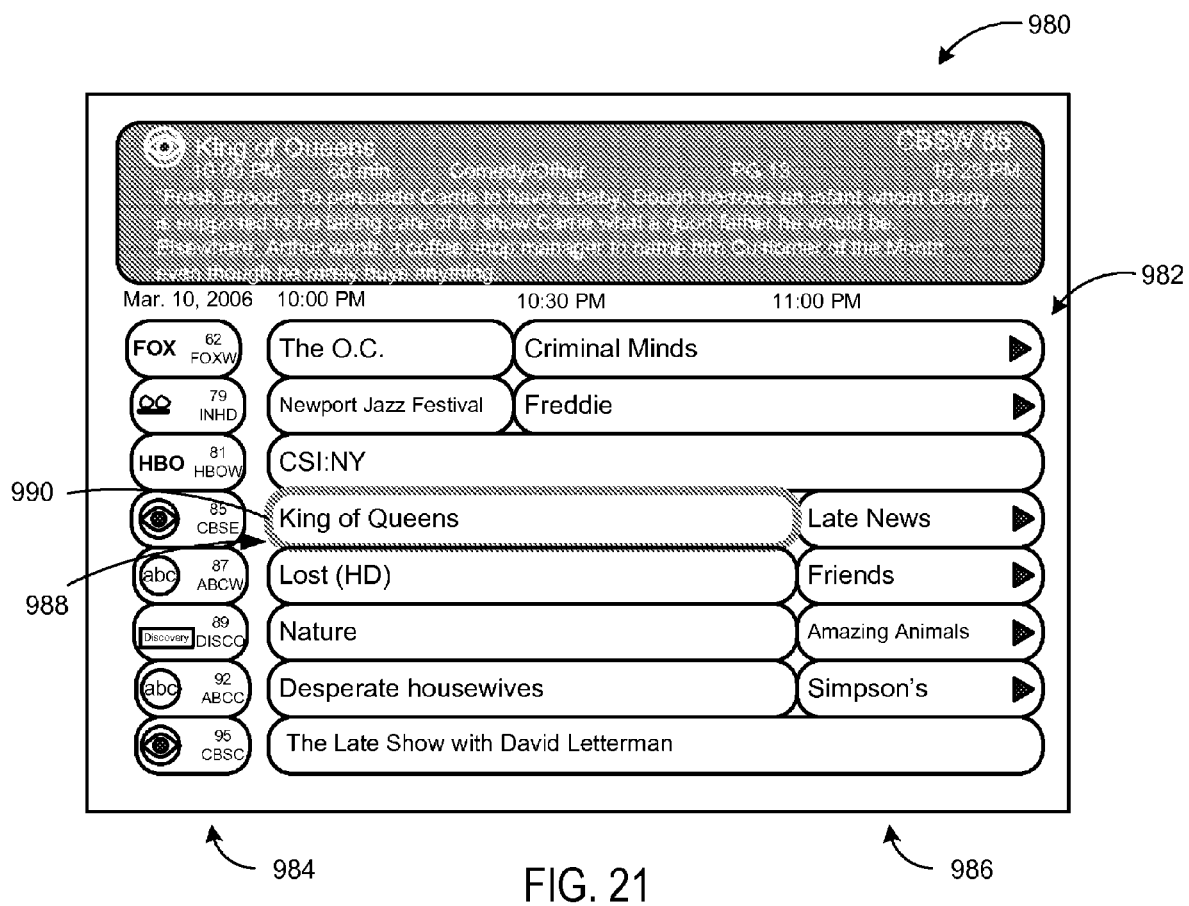
FIG. 21 is a screenshot of another example channel navigation menu.

FIG. 21 is a screenshot 980 of another example channel navigation menu 982. The screenshot 980 can be generated, for example, by the processing device 102, the UI engine 112, and the channel engine 116 of FIG. 1A or 1B. The channel navigation menu 982 can be generated by pressing the forward/next area on the rotational input of the remote control device 108 when viewing the channel navigation menu 904 adjacent the perspective video environment 902. For example, pressing the forward/next area on the rotational input of the remote control device 108 when viewing a screen such as the screenshot 900 of FIG. 17A can cause the channel navigation menu 982 to be generated. The channel navigation menu 982 can include a network column 984 that lists broadcast networks and programming columns 986 that list broadcast programs. A centrally disposed channel menu item 988 can be highlighted by a background highlight 990, i.e., the highlight remains in the center as the channel menu items scroll up or down. In one implementation, the background highlight 988 is limited to highlighting a broadcast program currently being broadcast.

Figure 22:
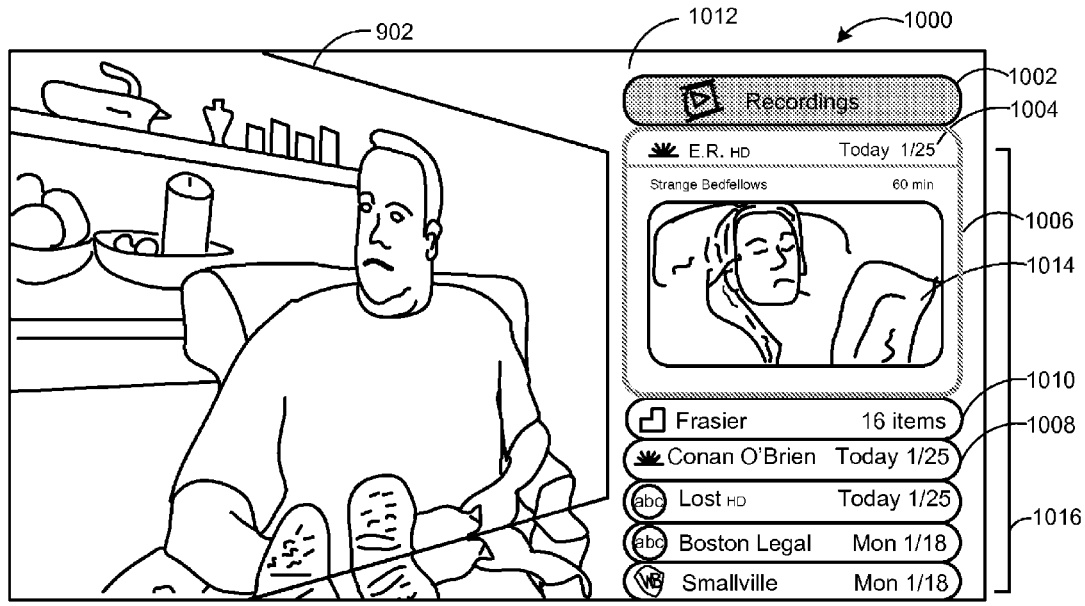
FIG. 22 is a screenshot of video data displayed in a video environment and including an example recording navigation menu.

FIG. 22 is a screenshot 1000 of video data displayed in a video environment 902 and includes an example recording navigation menu 1002. The screenshot 1000 can be generated, for example, by the processing device 102, the UI engine 112, and the recording engine 114 of FIG. 1A or 1B. The recording navigation menu 1002 can be generated, for example, by selecting the recordings icon 830 in the menu overlay 822. In this implementation, the video environment 902 is a perspective scale of the video environment 702 and can be generated by a perspective transition from the video environment 702 to the video environment 902 in a similar manner as described with respect to FIG. 17A. Likewise, the recording menu 1002 can be generated in a similar manner in the space 1012.

The recording menu items 1016 can include information for a single recording or information for a collection of recordings. For example, the recording menu items 1004 and 1008 include information for one recorded television program each, while the recording menu item 1010 stores information for 16 recorded items, as indicated by the folder menu item 1010.

In one implementation, a highlighted recording menu item 1004 includes additional information, such as a program episode title, a program duration, and the date the program was recorded. The highlighted recording menu item 1004 can also include a glow highlight 1006. In one implementation, the glow highlight provides the appearance of a backlit surface beneath the highlighted recording menu item 1004. A highlighted recording menu item can be selected by pressing the selection area on the rotational input device 109 of the remote control device 108.

In one implementation, a rotational input to the rotational input device 109 or the remote control device 108 causes the recording menu items 1016 to scroll up or down. For example, a clockwise rotational input causes the recording menu item 1004 to scroll down, and a counterclockwise rotational input causes the recording menu item 1004 to scroll up. In another implementation, the highlighted menu item scrolls up or down accordingly, as shown in FIG. 21, in which the top recording menu item 1004 is highlighted.

In one implementation, a video preview 1014 is generated after the recording menu item 1004 remains highlighted for a period of time, e.g., several seconds. In another implementation, the video preview 1014 is generated after the recording menu item is highlighted and at the cessation of a touch actuation (e.g., the lifting of a finger off the rotational input device 109 of the remote control device 108). The video preview 1014 can be generated, for example, by expanding the recording menu item 1004 vertically.

In the received/broadcast context, the video environment 902 can continue to display received video data. In the recording/playback context, the video environment 902 can continue to display a current recording that is being played back. In one implementation, if the highlighted recording menu item 1004 corresponds to the current recording displayed in the video environment 902, then a preview 1014 is not generated. In another implementation, the preview 1014 can be limited to only a portion of the recorded video event, e.g., the first few minutes of the recorded video event.

In another implementation, a recording menu item may include information related to a playlist, such as the example playlists described with respect to FIG. 29 below. For example, if a playlist is entitled "Kathy's Favs," then a recording menu item may likewise be entitled "Kathy's Favs." The recording menu item may provide information for a single stored program, if only one recorded program is stored, or may provide information for a collection of stored programs, if multiple programs are stored.

Figure 23:
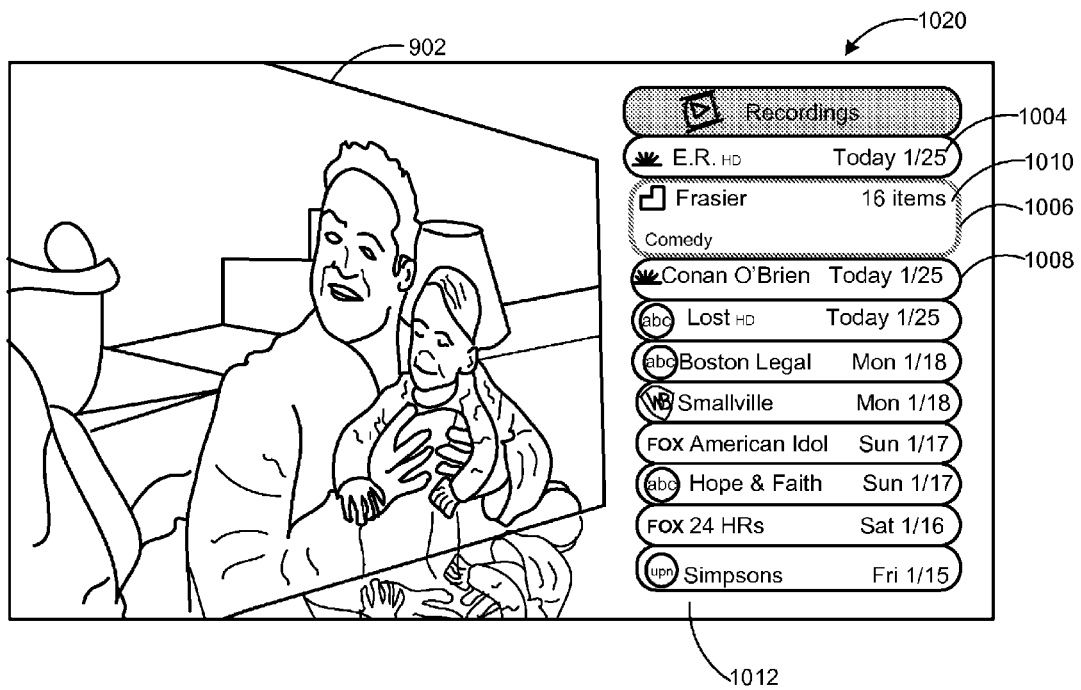
FIG. 23 is a screenshot of video data including an example folder menu item selected for highlight displayed in the recording navigation menu.

FIG. 23 is a screenshot 1020 of video data including an example folder menu item selected for highlight in the recording navigation menu 1002. The screenshot 1020 can be generated, for example, by the processing device 102, the UI engine 112, and the recording engine 114 of FIG. 1A or 1B. The recording menu item 1010 is highlighted, as indicated by the glow highlight 1006. In one implementation, additional information is displayed in a recording menu when the recording menu is highlighted. For example, the highlighted recording menu item 1010 includes additional information related to a category, i.e., "Comedy."

In one implementation, the highlighting of a recording menu item that corresponds to a collection of recordings does not generate a video preview. In another implementation, the highlighting of a recording menu item that corresponds to a collection of recordings generates brief video previews of each recorded television program. For example, the highlighted folder menu item 1010 corresponds to a collection of 16 recorded programs; accordingly, video previews for each of the 16 recorded programs can be generated in the recording menu item 1010. The video previews can be presented, for example, in chronological order, or in a random order, or in some other order.

Figure 24:
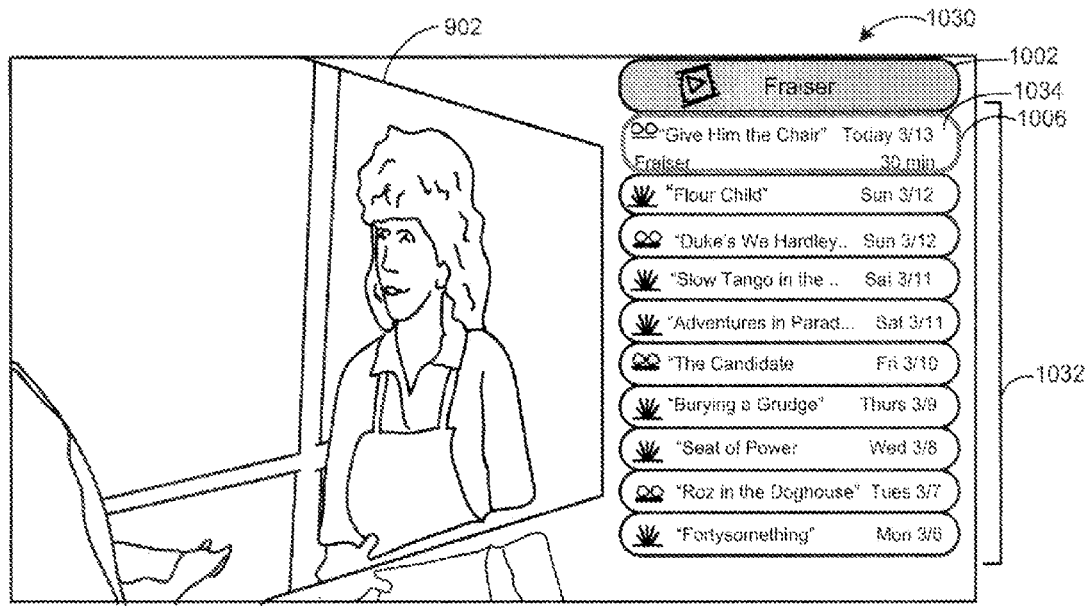
FIG. 24 is a screenshot of video data including example folder menu item contents displayed in the recording navigation menu.

FIG. 24 is a screenshot 1030 of video data including example folder contents, e.g., additional recording menu items 1032, displayed in the recording navigation menu 1002. The screenshot 1030 can be generated, for example, by the processing device 102, the UI engine 112, and the recording engine 114 of FIG. 1A or 1B. The example folder contents 1032 of FIG. 24 are generated in the recording navigation menu 1002 by selecting the highlighted folder menu item 1010 of FIG. 24. A selection can be made by pressing the selection area on the rotational input device 109 of the remote control device 108. The example folder contents 1032 as shown are recording menu items corresponding to recorded television programs. The folder contents 1032 may also include folder menu items corresponding to additional collections of recordings. In one implementation, the first menu item 1034 in the folder contents 1032 is highlighted by default, as indicated by the glow highlight 1006.

In another implementation, the folder items menu items in the recording navigation menu 1002 can also include menu items related to audio recordings. For example, a first menu item can be related to a recorded movie, and a second menu item can be a folder menu item that includes audio menu items that related to songs for a soundtrack related to the movie.

Figure 25:
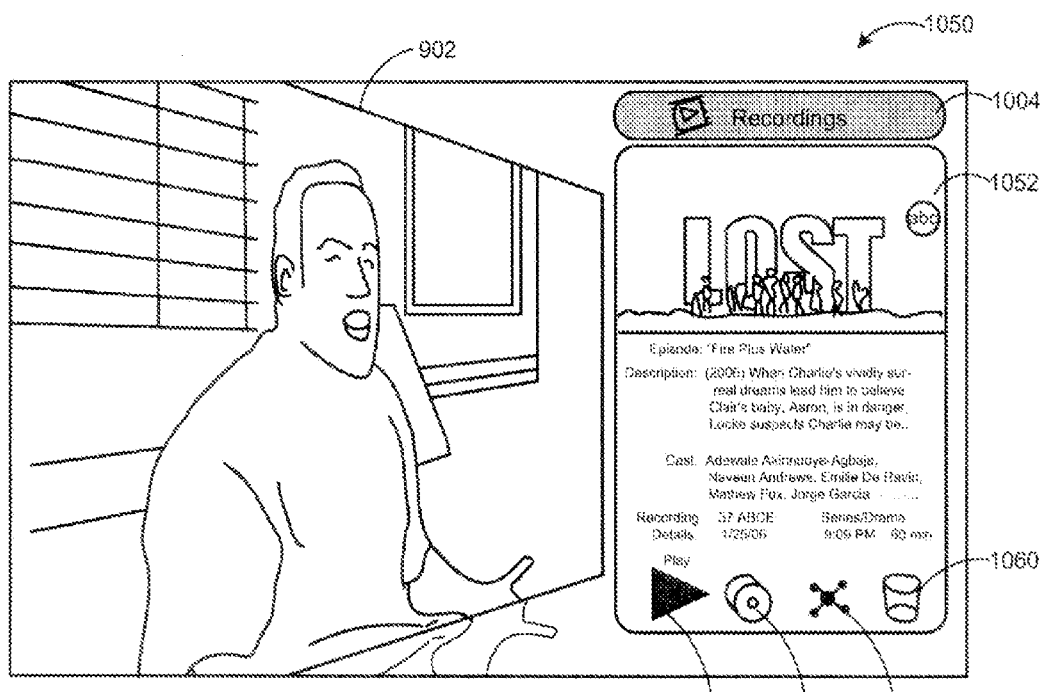
FIG. 25 is a screenshot of video data including an example action menu.

FIG. 25 is a screenshot 1050 of video data including an example action menu 1052. The screenshot 1050 can be generated, for example, by the processing device 102, the UI engine 112, and the recording engine 114 of FIG. 1A or 1B. Selecting a recording menu item corresponding to a recorded program displays the action menu 1052 for the recording. The action menu 1052 includes information about the recorded program, and includes a play icon 1054, a record all icon 1056, a related icon 1058, and a trash icon 1060.

The icons 1054, 1056, 1058 and 1060 may be navigated and selected by use of the rotational input device 109 and select area thereon of the remote control device 108. Selecting the play icon 1054 cause the recorded program to be played. In one implementation, the video environment reverts from the perspective scale video environment 902 to the full screen video environment 702 when a play icon 1054 is selected, and video data for the recorded program is presented in the full-screen video environment 702. In another implementation, presentation of the video data remains in the perspective video environment 902 when the play icon 1054 is selected. The presentation may be changed back to the full screen video environment 702 upon a user selection, e.g., pressing the menu area on the rotational input of the remote control device 108.

Selecting the record all icon 1056 causes the media processing system 100 to record episodes in a program series or record daily broadcasts of a program. Selecting the related icon 1058 provides additional information within the action menu 1052 related to program artists, program creators, content, etc. Selecting the delete icon 1060 places the recorded program in a trash store. A user may later empty the trash store to delete the recorded program. Pressing the menu area on the rotational input device 109 of the remote control device 108 returns to the recording navigation menu 1002 of FIG. 23.

Figure 26:
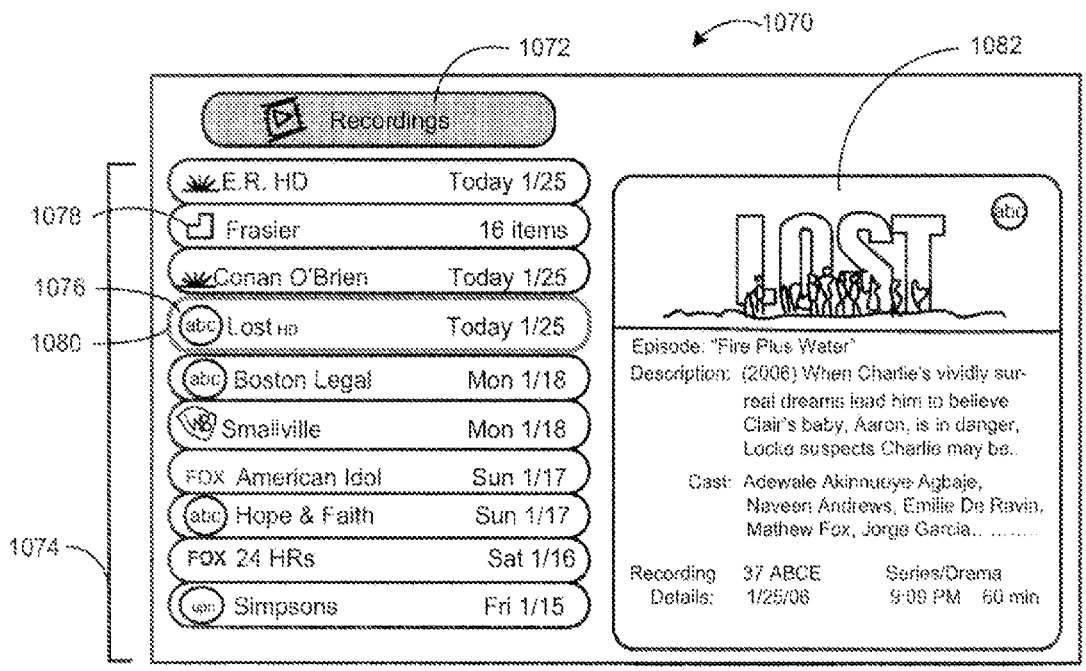
FIG. 26 is a screenshot of another example recording navigation menu.

FIG. 26 is a screenshot 1070 of another example recording navigation menu 1072. The screenshot 1070 can be generated, for example, by the processing device 102, the UI engine 112, and the recording engine 114 of FIG. 1A or 1B. The recording menu items 1074 can include information for a single recording or information for a collection of recordings. For example, the recording menu item 1076 includes information for one recorded television program, while the recording menu item 1978 stores information for 16 recorded items.

A glow highlight 1080 indicates a highlighted recording menu item 1076, and an information panel 1082 corresponding to the highlighted menu item 1076 is displayed adjacent the recording menu items 1074. In one implementation, the recording navigation menu 1072 can be generated by pressing the forward/next area on the rotational input device 109 of the remote control device 108 when the recordings menu 1004 is displayed adjacent the video environment 902.

Figure 27:
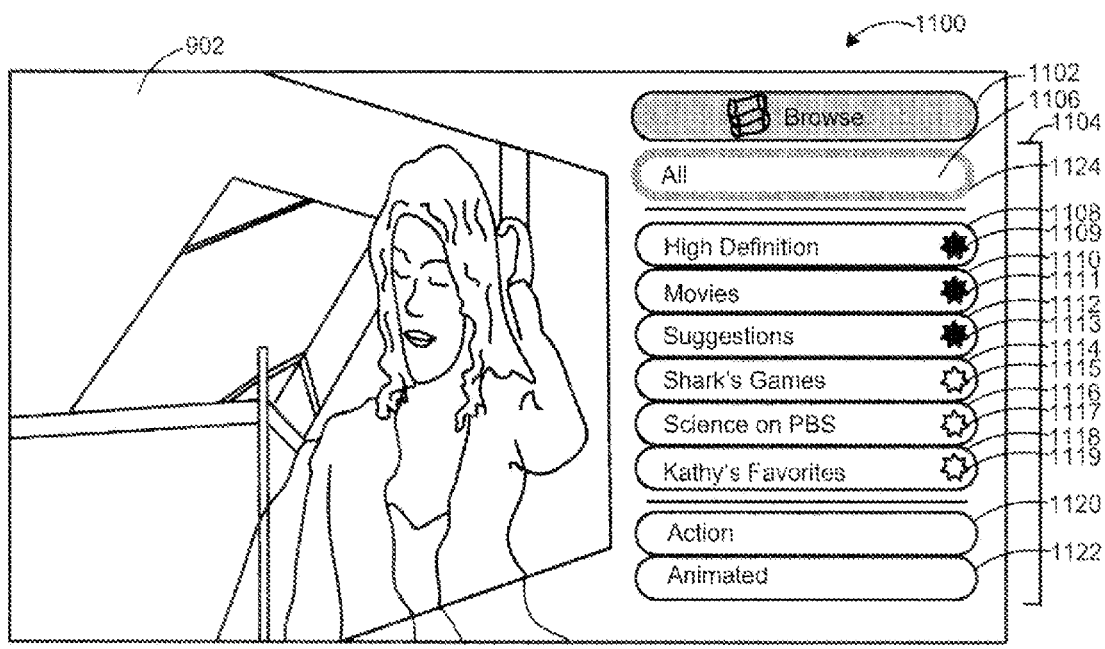
FIG. 27 is a screenshot of video data displayed in a video environment and including an FIG. 28 is a screenshot of video data including an example list of program corresponding to a selected playlist.

FIG. 27 is a screenshot 1100 of video data displayed in a video environment 902 and including an example browse navigation menu 1102. The screenshot 1100 can be generated, for example, by the processing device 102, the UI engine 112, and the browse engine 118 of FIG. 1A or 1B. The browse navigation menu 1002 can be generated, for example, by selecting the browse icon 834 in the menu overlay 822. The browse navigation menu 1102 includes playlists 1104. In one implementation, the playlists 1104 define video content categories. The playlists 1104 can include queries that search metadata associated with the video data. A playlist, such as playlist 1106, can be highlighted by a glow highlight 1124.

The playlists 1104 can also include an identifier to identify whether the playlist is system-defined or user-defined. For example, playlists 1108, 1110, and 1112 includes system-defined identifiers 1109, 1111, and 1113, and playlists 1114, 1116, and 1118 include user-defined identifiers 1115, 1117, and 1119. The identifiers can be based on color and/or shape.

A system-defined playlist can be a playlist that is predetermined or includes preconfigured search logic or filters. For example, the playlist 1108 generates a list of high definition programs; the playlist 1110 generates a list of movies; and the playlist 1112 generates a list of suggested programs that can be based on a viewer's viewing habits.

A user-defined playlist can be a playlist that is defined by the user. For example, the playlist 1114 can generate a list of games for a sports team; the playlist 1116 can generate a list of science programming on a particular broadcast network; and the playlist 1118 can generate a list of favorite programs that are specified by a user.

The playlists 1104 can also be based on genres. For example, the playlists 1120 and 1122 are based on action and animated games, respectively.

In one implementation, the playlists 1104 can be configured to generate lists based on programs that are to be broadcast. In another implementation, the playlists 1104 can be configured to generate lists based on programs that are recorded and stored in a data store or a remote store. In yet another implementation, the playlists 1104 can be configured to generate lists based on both programs to be broadcast and programs that are stored in the data sore. In still another implementation, the playlists 1104 can be configured to generate a list of programs available for purchase and that satisfy a search criteria. Creation, navigation and selection of the playlists 1104 can be accomplished by use of the rotational input device 109 on the remote control device 108, or by other input devices.

Figure 28:
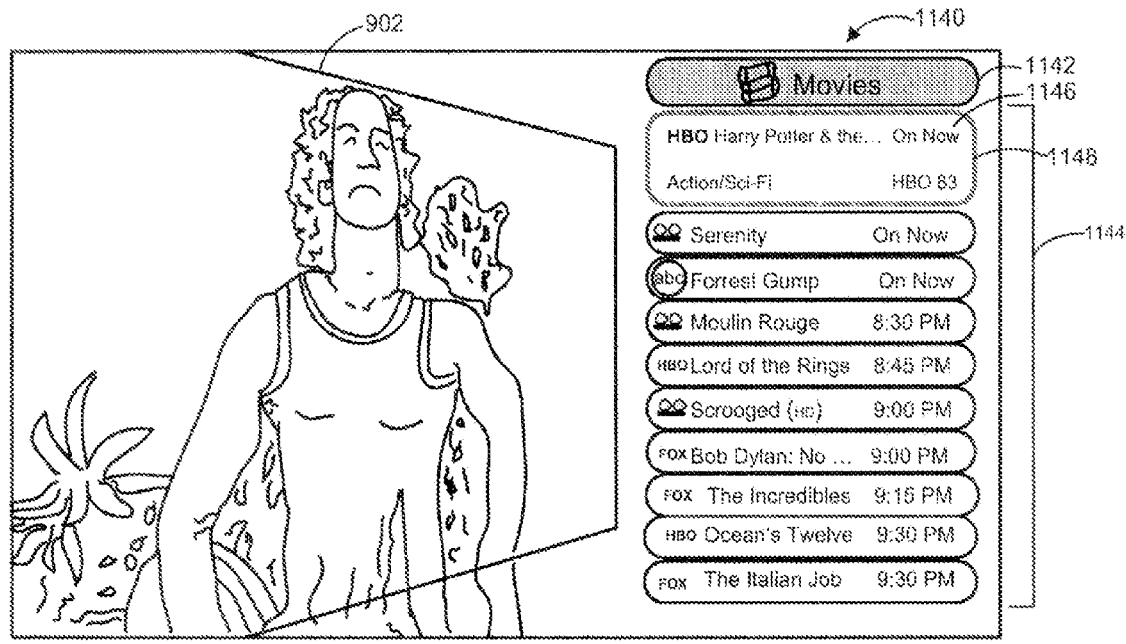

FIG. 28 is a screenshot 1140 of video data including an example list 1142 of programs corresponding to a selected playlist. The screenshot 1140 can be generated, for example, by the processing device 102, the UI engine 112, and the browse engine 118 of FIG. 1A or 1B. The program list 1142 includes a list of playlist menu items 1144. The example playlist menu items 1144 are generated by selecting the playlist 1110 of FIG. 27 and correspond to movies that are currently being broadcast or to be broadcast within a certain time period, e.g., within 24 hours. A playlist menu item may be highlighted for selection, such as the playlist menu item 1146, which is highlighted by a glow highlight 1148.

Figure 29:
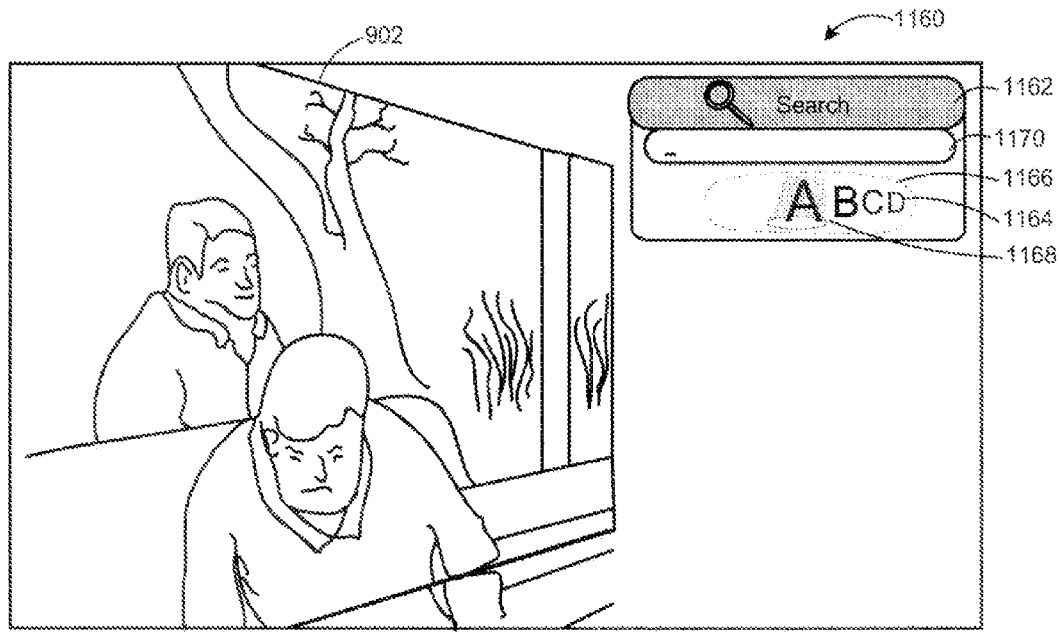
FIG. 29 is a screenshot of video data displayed in a video environment and including an example search navigation menu.

FIG. 29 is a screenshot 1160 of video data displayed in a video environment 902 and including an example search navigation menu 1162. The screenshot 1160 can be generated, for example, by the processing device 102, the UI engine 112, and the search engine 120 of FIG. 1A or 1B. The search navigation menu 1162 can be generated, for example, by selecting the search icon 836 in the menu overlay 822. The search menu 1162 includes a character set 1164 mapped onto a multidimensional surface 1166, e.g., a cylindrical surface. In one implementation, the multidimensional surface is transparent, e.g., a displacement surface as indicated by the dashed phantom lines of FIG. 29.

A highlight zone 1168 is generated, and the character mapped multidimensional surface 1166 rotates through the highlight zone 1168. In one implementation, the highlight zone 1168 resembles a spotlight artifact. When a mapped character is within the highlight zone 1168, it is highlighted as an input character. As shown in FIG. 29, the character "A" is the current input character. In one implementation, an audio signal is generated as a character is highlighted. The audio signal can be a click, a short musical tone, or some other audio signal.

The multidimensional surface 1166 may be rotated in accordance with a user input. In one implementation, a rotational actuation of the rotational input device 109 causes a corresponding rotation of the multidimensional surface 1166. Pressing a select area on the rotational input device 109 causes the input character to be entered into a search field 1170.

Providing a rotational input on the rotational input device (e.g., moving a fingertip on the surface of the rational input device in a circular motion) of the remote control device 108 causes the multidimensional surface 1166 to rotate accordingly. The speed of rotation may be proportional to the rate of rotation or to the magnitude of angular deflection from a reference point.

Figure 30:
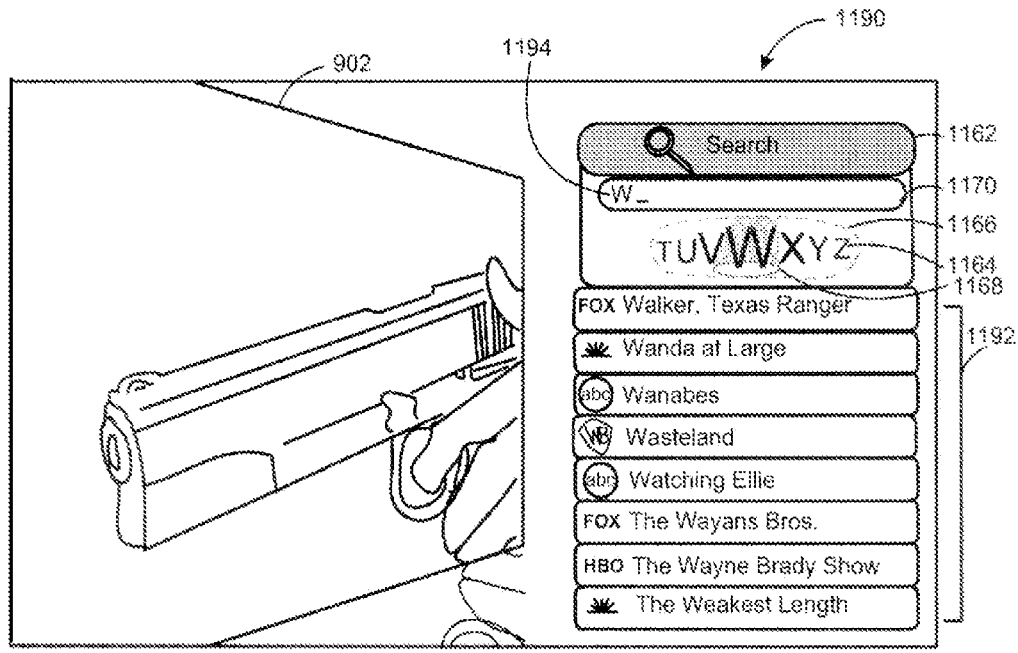
FIG. 30 is a screenshot of video data including search results displayed in the search navigation menu.

In one implementation, upon entry of an input character into the search field 1170, a metadata search is performed, and the results are displayed. Entry of additional characters can further refine the search. FIG. 30 is a screenshot 1190 of video data including search results 1192 displayed in the search navigation menu 1162. The screenshot 1190 can be generated, for example, by the processing device 102, the UI engine 112, and the search engine 120 of FIG. 1A or 1B. As shown in FIG. 30, the input character 1194, e.g., "W," causes a search engine to generate the search results 1192.

Figure 31:
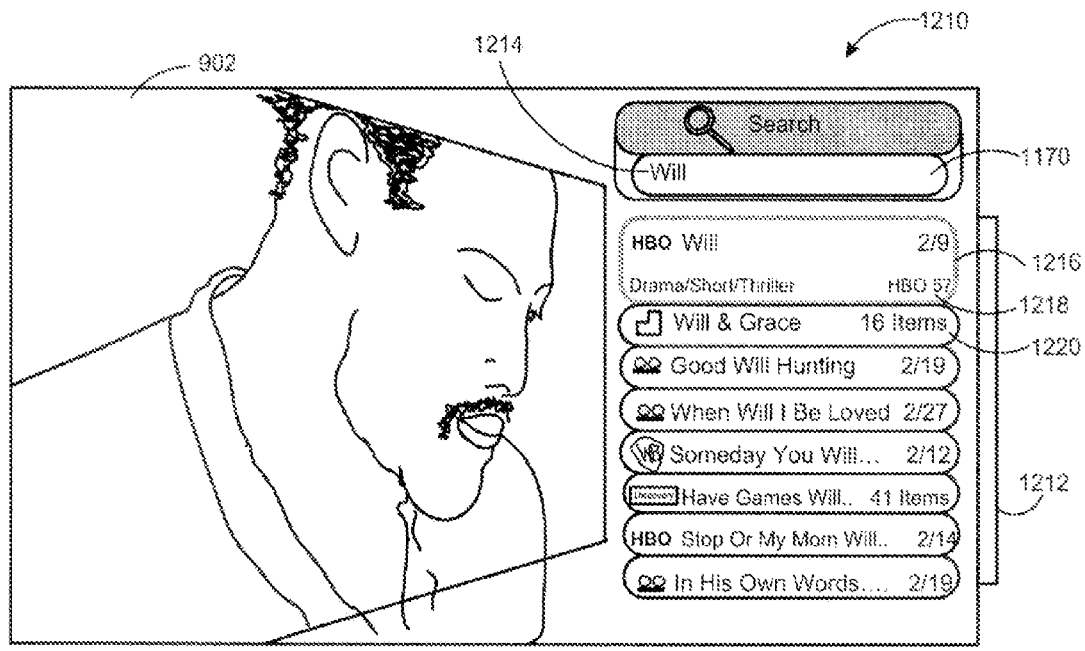
FIG. 31 is a screenshot of video data including further search results menu items displayed in the search navigation menu.

FIG. 31 is a screenshot 1210 of video data including further search results menu items 1212 displayed in the search navigation menu 1162. The screenshot 1210 can be generated, for example, by the processing device 102, the UI engine 112, and the search engine 120 of FIG. 1A or 1B. The input characters 1214, e.g., "WILL," have caused the search engine to generate a list or refined search result menu items 1212. Additionally, the multidimensional surface 1166 and mapped characters 1164 are no longer displayed, as the search result menu item 1216 has been highlighted by the glow highlight 1218. Such highlighting represents that navigation functions are now focused on the search results 1212. In one implementation, a user may focus navigation on the search results by pressing the play/pause area on the rotational input device 109 of the remote control device 108.

The search result menu items 1212 can include information for a single recording or information for a collection of recordings or broadcasts. For example, the search result menu item 1216 includes information for one television program, while the search result menu item 1220 includes information for 16 items.

Figure 32:
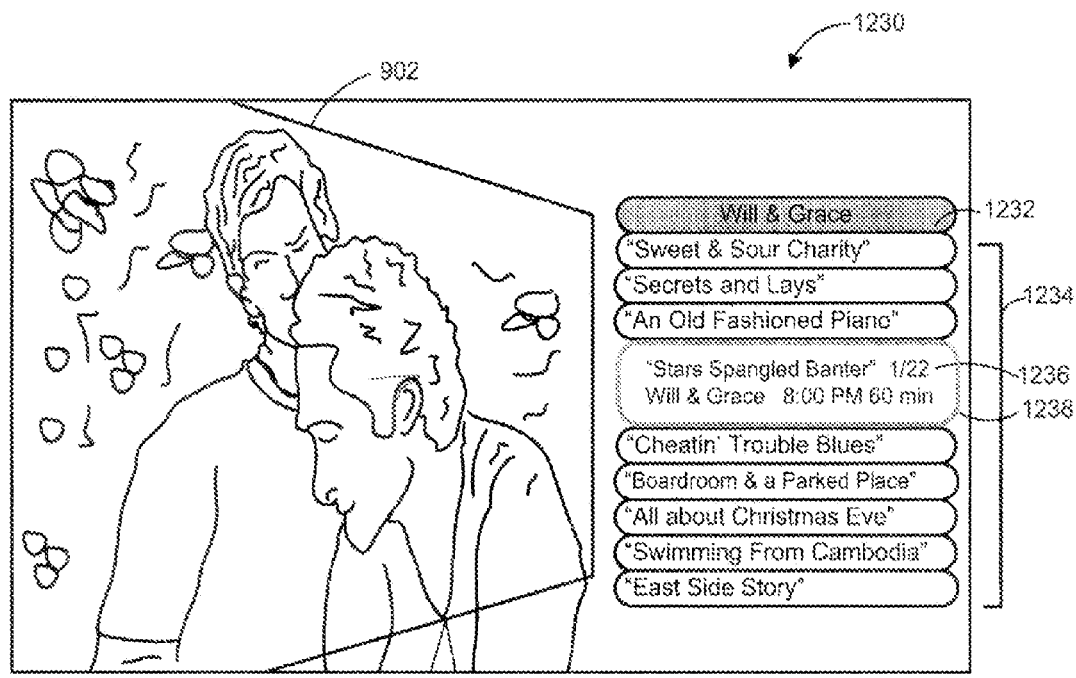
FIG. 32 is a screenshot of video data including search results for an example folder data item.

FIG. 32 is a screenshot 1230 of video data including an example search menu 1232 including search results menu items 1234. The screenshot 1230 can be generated, for example, by the processing device 102, the UI engine 112, and the search engine 120 of FIG. 1A or 1B. The search results menu items 1234 corresponds to the items referenced in the search results menu item 1220. The search results menu item 1236 is highlighted by the glow highlight 1238.

Figure 33:
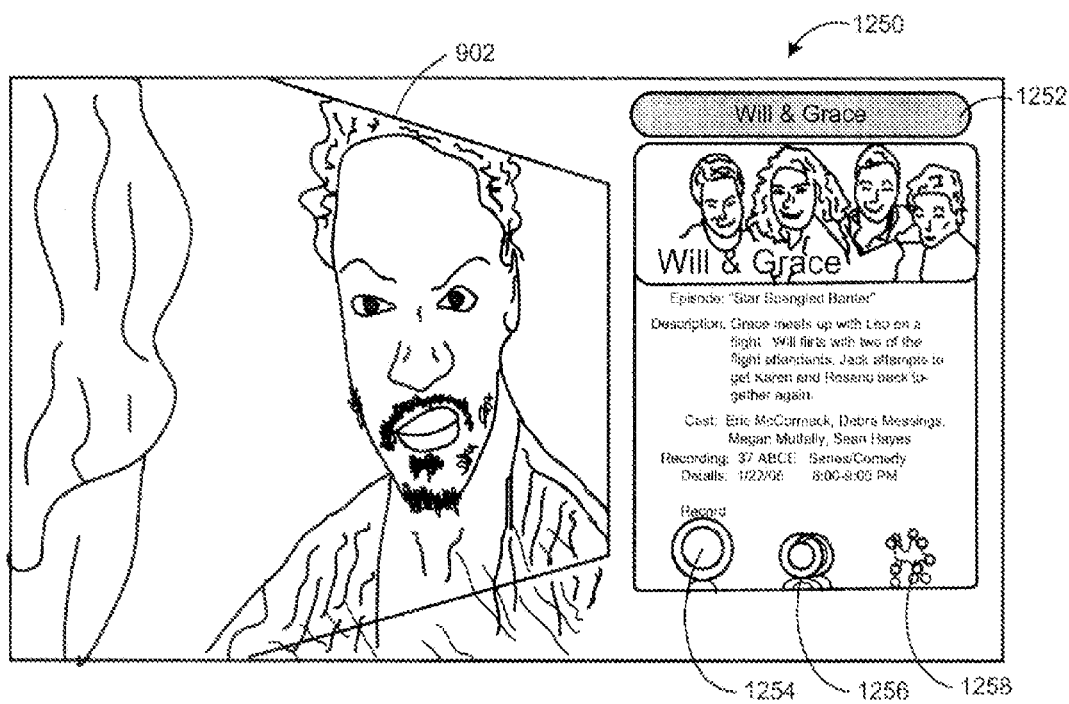
FIG. 33 is a screenshot of video data including an example action menu for a selected search result.

FIG. 33 is a screenshot 1250 of video data including an example action menu 1252 for a selected search result. The screenshot 1250 can be generated, for example, by the processing device 102, the UI engine 112, and the search engine 120 of FIG. 1A or 1B. The action menu 1252 includes information about the program corresponding to the selected search result, e.g., search result 1236 of FIG. 32, and includes a record icon 1254, a record all icon 1256, and a related icon 1258. Selecting the record icon 1254 causes the program to be recorded when broadcast. Selecting the record all icon 1256 causes the media processing system 100 to record episodes in a program series or record daily broadcasts of a program. Selecting the related icon 1258 provides additional information within the action menu 1052 related to program artists, program creators, content, etc.

The example screenshot 1250 of FIG. 33 corresponds to a program to be broadcast. Had the search result 1236 of FIG. 32 corresponded to a recorded program, a play icon and a trash icon would have been generated in the action menu 1252, and the record icon 1254 would not be generated.

In another implementation, the search engine 120 performs searches that are system-wide and not limited to recordings, or upcoming programs, or other defined data sets. For example, a search term or string can generate search results related to recordings, programs to be recorded, broadcast schedules, and playlists. For example, the search term "Will" can generate a list of recordings, e.g., recorded episodes of "Will and Grace" and the recorded movie "Good Will Hunting," a recording schedule for upcoming episodes of "Will and Grace" that are to be recorded, a broadcast schedule for "Will and Grace," and a playlist that includes results related to the search term "Will."

Figure 34:
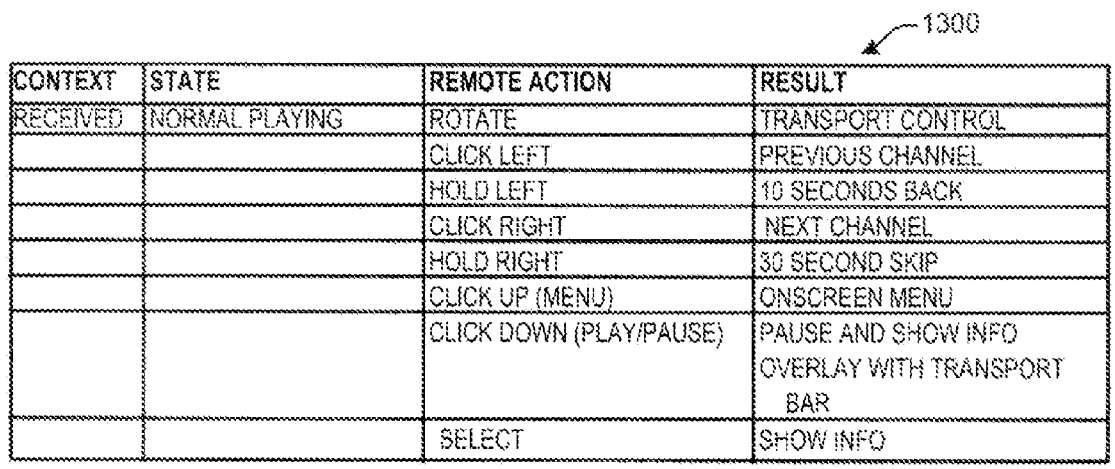
FIG. 34 is an example state table for received context.

FIG. 34 is an example state table 1300 for a received context. The state table 1300 defines state transitions in response to remote control device actions during a received context and during a normal playing state. An example normal playing state in a received context is viewing a broadcast video program as it is received.

The remote action column lists remote actions that during the received context and normal playing state will cause a state transition. A rotate action, e.g., a rotational actuation of the rotational input device 109 of the remote control device 108, changes the state to a transport control state, which is described with reference to FIGS. 35-39 below.

A click left action, e.g. pressing and then releasing the reverse/previous area on the rotational input device 109 of the remote control device 108, changes to a previous channel.

A hold left action, e.g., pressing and holding the reverse/previous area on the rotational input device 109 of the remote control device 108, accesses the video data corresponding to a time that is, for example, 10 seconds previous.

A click right action, e.g. pressing and then releasing the forward/next area on the rotational input device 109 of the remote control device 108, changes to a next channel.

A hold right action, e.g., pressing and holding the forward/next area on the rotational input device 109 of the remote control device 108, accesses the video data beginning at a time that is, for example, 30 seconds forward in time from the currently accessed video data, or accesses the most recently stored video data if the video data currently accessed is less than 30 seconds prior in time from the most recently stored video data.

A click up action, e.g., pressing and then releasing the menu area on the rotational input device 109 of the remote control device 108, generates an onscreen menu, e.g., the menu overlay 822.

A click down action, e.g., pressing and then releasing the play/pause area on the rotational input device 109 of the remote control device 108, pauses the video data being displayed and generates an information overlay and a transport bar, e.g., the information overlay 802 and transport bar 722.

A select action, e.g., pressing and then releasing the select area on the rotational input device 109 of the remote control device 108, generates the information overlay, e.g., the information overlay 802.

Figure 35:
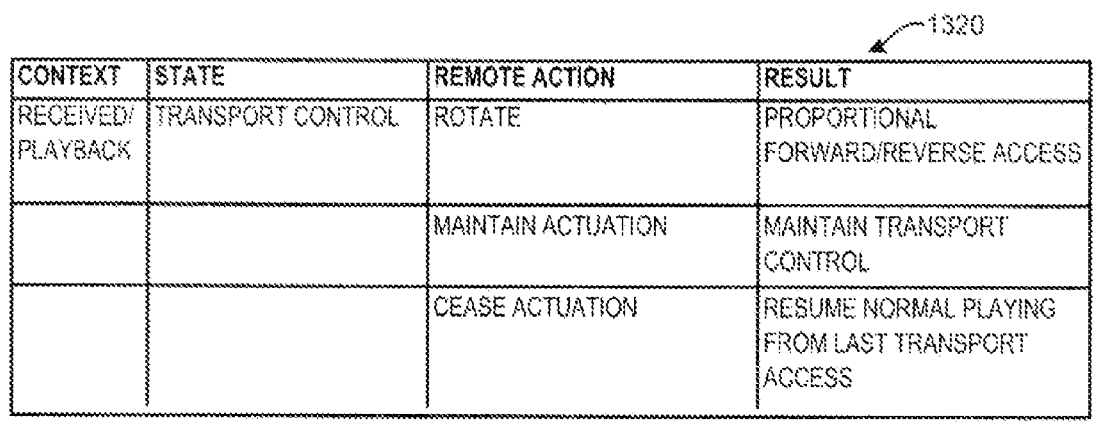
FIG. 35 is an example state table for a transport control state.

FIG. 35 is an example state table 1320 for a transport control state. A transport control state allows a user to transport through the video data in a forward or reverse direction based on a series of actuations. The state table 1320 defines state transitions in response to remote control device actions during a received context or a playback context, and during the transport control state. In one implementation, the transport control state is maintained only during the duration of a touch actuation.

A rotate action, e.g., a rotational actuation of the rotational input device 109 of the remote control device 108, causes the video data to be accessed at a proportional forward or reverse rate. In one implementation, a slow rotational actuation causes a frame-by-frame forward or reverse access, and the forward or reverse access is further exponentially proportional to the speed of the rotational actuation. In another implementation, a small angular deflection from a reference position cause a frame-by-frame forward or reverse access, and the forward or reverse access is further exponentially proportional to the magnitude of the angular deflection. Other access rate processes may also be used.

Maintaining the actuation maintains the transport control state, and ceasing the actuation, e.g., lifting a finger off the rotational input device 109 of the remote control device 108, reverts back to the normal playing state, and the video data is processed beginning at the video data last accessed during the transport control state.

The transport control state thus provides an intuitive and simple access process for a user, and can be invoked by, for example, simply by placing a finger on an input device 109 and rotating the finger in a clockwise or counterclockwise direction. The user may thus quickly and easily access video data without the need to separately select pause, forward or reverse controls, and may resume a normal playing state by simply lifting a finger off the rotational input device 109.

Figure 36:
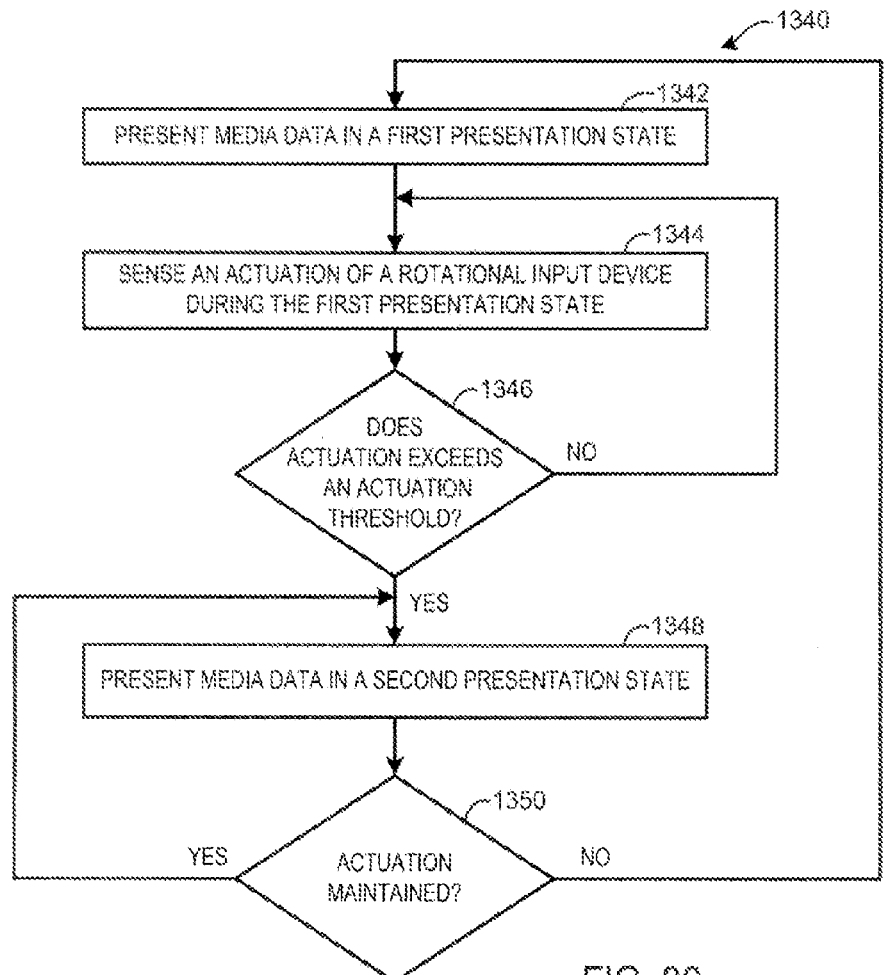
FIG. 36 is a flow diagram of an example transport control process.

FIG. 36 is a flow diagram of an example transport control process 1340. Stage 1342 presents media data in a first presentation state. For example, video data my be processed by a video processing system, such as the media processing system 100, and be output to a display device.

State 1344 senses an actuation of a rotational input device during the first presentation state. For example, a user may touch the rotational input device 109 on the remote control device 108.

Stage 1346 determines if the actuation exceeds an actuation threshold. For example, the control engine 110 and/or the processing device 102 can determine if an actuation exceeds a rotational threshold, a time threshold, or some other threshold. If the actuation does not exceed an actuation threshold, then the process returns to stage 1344.

If the actuation does exceed an actuation threshold, then state 1348 presents the media data in a second presentation state. For example, the UI engine 112 and/or the processing device 102 can present the video data in the transport state if the actuation exceeds the actuation threshold.

Stage 1350 determines if the actuation is maintained. For example, the control engine 110 and/or the processing device 102 can determine if the touch actuation has ceased. If the touch actuation has not ceased, then the process returns to stage 1348. If the actuation has ceased, then the process returns to stage 1342.

Figure 37:
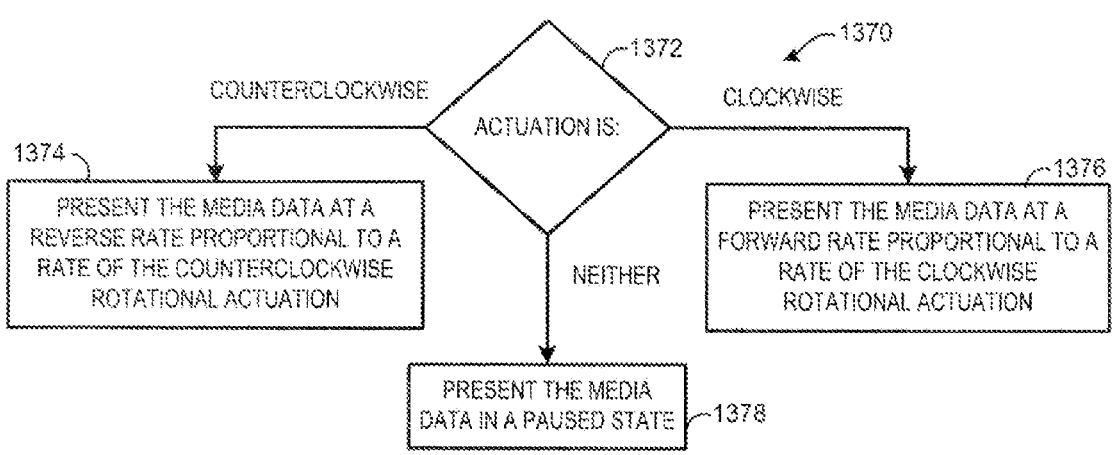
FIG. 37 is a flow diagram of an example transport control access process.

FIG. 37 is a flow diagram of an example transport control access process 1370. The example transport control access process 1370 can be utilized to access media data during the transport control state.

Stage 1372 determines if a direction of actuation, e.g., if a rotational actuation is counterclockwise, clockwise, or stationary. For example, the control engine 110 and/or the processing device 102 can determine if the remote control signals received from the remote control device 108 correspond to a counterclockwise, clockwise, or stationary rotational actuation.

If the actuation is in a first direct, e.g., counterclockwise, then stage 1374 presents the media data at a reverse rate. The reverse rate can be proportional to the rate of counterclockwise rotational actuation. For example, the UI engine 112 and/or the processing device 102 can access the video data and present the video data at a reverse rate that is exponentially proportional to the rate of counterclockwise rotational actuation.

If the actuation is in a second direction, e.g., clockwise, then stage 1376 presents the media data at a forward rate. The forward rate can be is proportional to the rate of clockwise rotational actuation. For example, the UI engine 112 and/or the processing device 102 can access the video data and present the video data at a forward rate that is exponentially proportional to the rate of clockwise rotational actuation.

If the actuation does not have a directional component, e.g., the action corresponds to a stationary digit on a rotational input, then stage 1378 presents the media in a paused state. For example, the UI engine 112 and/or the processing device 102 can access the video data and present the video data at a paused state, e.g., display one frame of video data.

Other transport control access processes may also be used. For example, media data access may be based on an angular displacement from a reference position, or based on some other access process.

Figure 38:
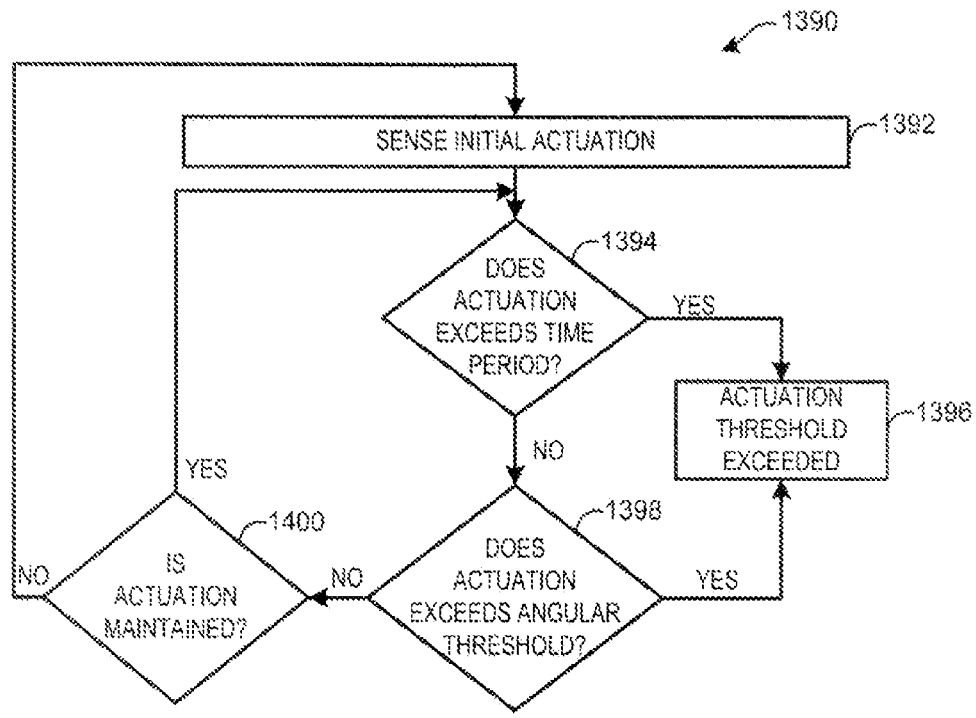
FIG. 38 is a flow diagram of an example transport control actuation process.

FIG. 38 is a flow diagram of an example transport control actuation process 1390. The transport control actuation process 1390 can be utilized to determine if an actuation exceeds an actuation threshold.

State 1392 senses an initial touch actuation, e.g., a touch actuation. For example, the remote control device 108 may generate a control signal indicating that a user's finger has been placed on the surface of the rotational input device 109.

Stage 1394 determines if the actuation exceeds a first threshold, e.g., a time period. For example, the control engine 110 and/or processing device 102 may determine if the touch actuation is maintained for a period of time, e.g., one second. If the actuation exceeds the second threshold, then stage 1396 determines that the activation threshold is exceeded, and the transport control state is invoked.

If the actuation does not exceed the time period, then stage 1398 determines if the actuation exceeds a second threshold, e.g., an angular threshold. For example, the control engine 110 and/or processing device 102 may determine if the touch actuation is a rotational actuation that rotates beyond a threshold, e.g., 15 degrees. If the touch actuation exceeds the angular threshold, then stage 1396 determines that the activation threshold is exceeded, and the transport control state is invoked.

If the touch actuation does not exceed the second threshold, then stage 1400 determines if the actuation is maintained. For example, the control engine 110 and/or the processing device 102 can determine if the touch actuation has ceased. If the actuation has not ceased, then the process returns to stage 1394. If the actuation has ceased, then the process returns to stage 1392.

Figure 39:
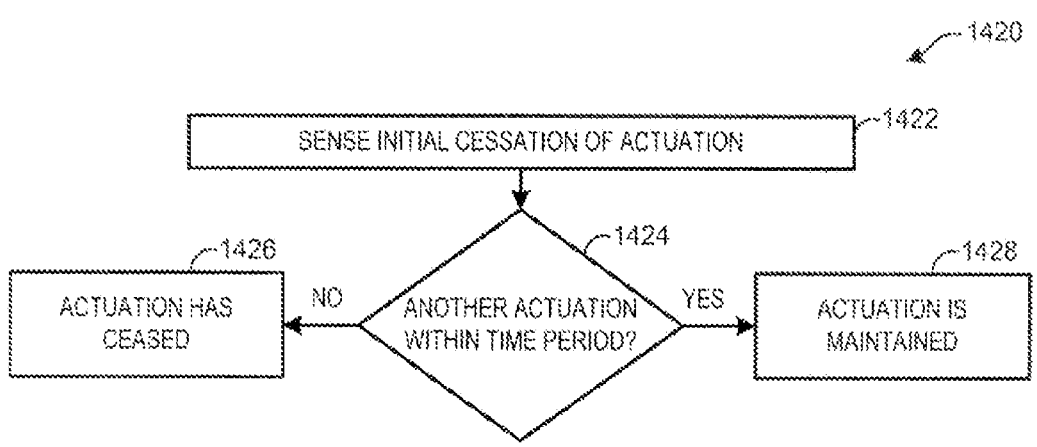
FIG. 39 is a flow diagram of an example transport control cessation process.

FIG. 39 is a flow diagram of an example transport control cessation process 1420. The transport control cessation process 1420 can be used to determine if an actuation is maintained or has ceased.

Stage 1422 senses an initial cessation of an actuation. For example, the remote control device 108 can generate a control signal indicating that a user's finger has been removed from the surface of the rotational input device 109.

Stage 1424 determines if another actuation occurs within a time period. For example, the control engine 110 and/or processing device 102 can determine whether the remote control device 108 generates a control signal indicating that a user's finger has been placed on the surface of the rotational input device 109 within a time period, e.g., 200 milliseconds, after sensing the initial cessation of the touch actuation.

If another actuation does not occur within the time period, then stage 1426 determines that the actuation has ceased. Conversely, if another actuation does occur within the time period, then stage 1428 determines that the actuation is maintained.

In another implementation, an actuation is determined to have ceased upon sensing an initial cessation of the actuation.

Figure 40:
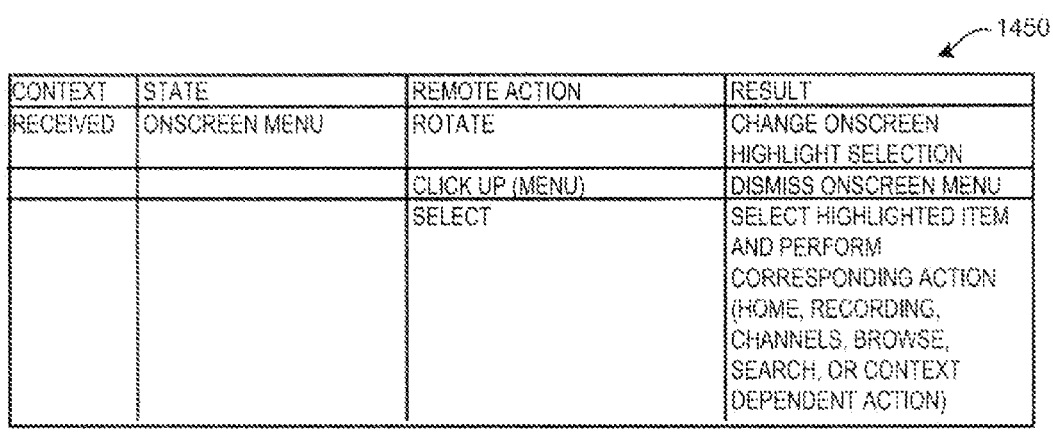
FIG. 40 is an example state table for an onscreen menu state in a received context.

FIG. 40 is an example state table 1450 for an onscreen menu state in a received context. The state table 1450 defines state transitions in response to remote control device actions during a received context when an onscreen menu, e.g., menu overlay 822, is present.

A rotate action changes a highlight selection in an onscreen menu. For example, a rotational actuation can be used to selectively highlight icons 828, 830, 832, 834, 836, and 838 in the menu overlay 822.

A click up/menu action dismisses the onscreen menu. A select action selects a highlighted icon and performs an associated process. For example, selecting the recording navigation icon 830 causes the recordings navigation menu 1002 to be generated; selecting the channels navigation icon 832 causes the channels navigation menu to be generated; selecting the browse navigation icon 834 causes the browse navigation menu 1102 to be generated; and selecting the search navigation icon 836 causes the search navigation menu 1162 to be generated.

Figure 41:
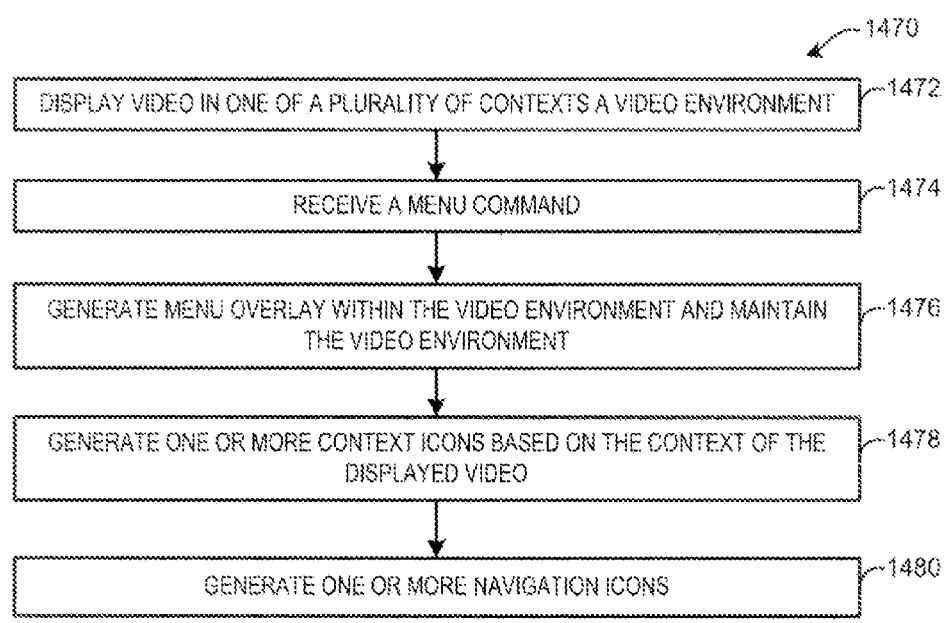
FIG. 41 is a flow diagram of an example onscreen menu process.

FIG. 41 is a flow diagram of an example onscreen menu process 1470. In one implementation, the onscreen menu process 1470 can be invoked by menu action on the rotational input device 109 to generate the menu overlay 833 and icons 828, 830, 832, 834, 836 and 838 as shown in FIG. 13.

Stage 1472 displays video in one of a plurality of contexts in a video environment. For example, the UI engine 112 and/or processing device 102 can display video in a full-screen environment in either a received/broadcast context or a recording/playback context.

Stage 1474 receives a menu command. For example, the remote control 108 can transmit a menu commend to the controller engine 110 and/or processing device 102.

Stage 1476 generates a menu overlay within the video environment and maintains the video environment. For example, the UI engine 112 and/or the processing device 102 can generate a translucent menu overlay 822.

Stage 1478 generates one or more context icons based on the context of the displayed video. For example, in the received context, the UI engine 112 and/or the processing device 102 can generate a record icon 838, and in the playback context, a delete icon 862 can be generated.

Stage 1480 generates one or more navigation icons. For example, the UI engine 112 and/or the processing device 102 can generate the navigation icons 828, 830, 832, 834 and 836 in the menu overlay 822.

Figures 42, 43:
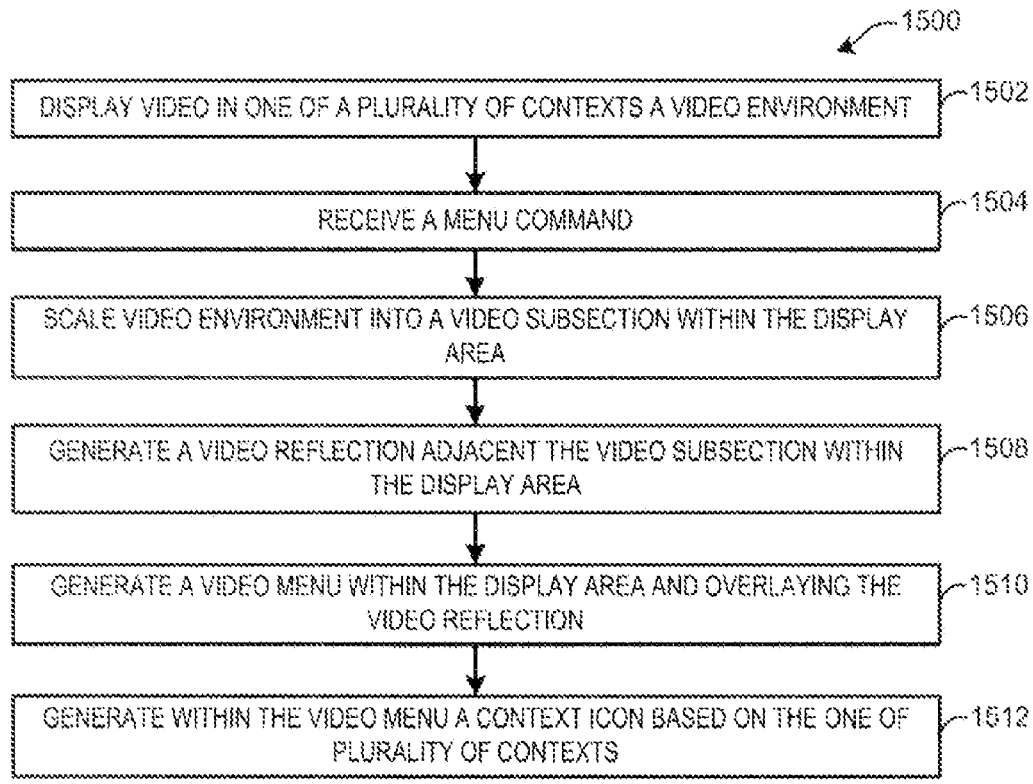
FIG. 42 is a flow diagram of another example onscreen menu process.
FIG. 43 is an example state table for a pause state in a received context.

FIG. 42 is a flow diagram of another example onscreen menu process 1500. In one implementation, the onscreen menu process 1500 can be invoked by menu action on the rotational input device 109 to generate the menu overlay 882 and icons as shown in FIG. 16.

Stage 1502 displays video in one of a plurality of contexts in a video environment. For example, the UI engine 112 and/or processing device 102 can display video in a full-screen environment in either a received/broadcast context or a recording/playback context.

Stage 1504 receives a menu command. For example, the remote control 108 can transmit a menu commend to the controller engine 110 and/or processing device 102.

Stage 1506 scales the video environment into a video subsection within the display area. For example, the UI engine 112 and/or the processing device 102 can scale the video environment as shown in FIG. 16.

Stage 1508 generates a video reflection adjacent the video subsection within the display area. For example, the UI engine 112 and/or the processing device 102 can generate a video reflection adjacent the video subsection within the display area as shown in FIG. 16.

Stage 1510 generates a video menu within the display area and overlaying the video reflection. For example, the UI engine 112 and/or the processing device 102 can generate the menu overlay 882 as shown in FIG. 16.

Stage 1512 generates a context icon based on the one of the plurality of contexts that the video is displayed. For example, in the received context, the UI engine 112 and/or the processing device 102 can generate a record icon and in the playback context, a delete icon can be generated.

FIG. 43 is an example state table 1520 for a pause state in a received context. The state table 1520 defines state transitions in response to remote control device actions received during a received context and while in a paused state.

A rotate action causes a scrub or job of the video data. For example, a rotational actuation in the clockwise direction scrubs forward through the video data, and a rotational actuation in the counterclockwise direction scrubs backward through the video data.

A click left action changes to a previous channel. In one implementation, the video data corresponding to the previous channels is presented in a paused state.

A hold left action accesses the video data corresponding to a time that is, for example, 10 seconds previous.

A click right action changes to a next channel. In one implementation, the video data corresponding to the next channels is presented in a paused state.

A hold right action accesses the video data beginning at a time that is, for example, 30 seconds forward in time from the currently accessed video data, or accesses the most recently stored video data if the video data currently accessed is less than 30 seconds prior in time from the most recently stored video data.

A click up/menu action dismisses an information overlay, e.g. the information overlay 902, if the information overlay is displayed.

A click down action reverts to the normal playing state. In one implementation, an information overlay and/or transport bar is present during the pause state, and the information overlay and/or transport bar fades out after resuming the normal playing state.

A select action generates the information overlay if no information overlay is shown.

FIG. 44 is an example state table 1540 for an information overlay state in a received context. The state table 1540 defines state transitions in response to remote control device actions received during a received context and while an information overlay and transport bar is displayed, e.g., as shown in FIG. 12.

A rotate action causes the scrub or job of the video data. For example, a rotational actuation in the clockwise direction scrubs forward through the video data, and a rotational actuation in the counterclockwise direction scrubs backward through the video data.

A click left action changes to a previous channel.

A hold left action accesses the video data corresponding to a time that is, for example, 10 seconds previous.

A click right action changes to a next channel.

A hold right action accesses the video data beginning at a time that is, for example, 30 seconds forward in time from the currently accessed video data, or accesses the most recently stored video data if the video data currently accessed is less than 30 seconds prior in time from the most recently stored video data.

A click up/menu action dismisses the information overlay.

A click down action pauses the displaying of the video data.

FIG. 45 is an example state table 1560 for a channel list state in a received context. The state table 1560 defines state transitions in response to remote control device action received during a received context and while a channel navigation menu is displayed, e.g., channel navigation menu 904 of FIG. 17A.

A rotate action moves up or down the channel list. For example, a rotational actuation in the clockwise direction moves the channel menu items 912 down and thus highlights channel menu items in descending order, and a rotational actuation in the counterclockwise direction moves the channel menu items 912 up and thus highlights channel menu items in ascending order.

Maintaining a touch actuation, e.g., maintaining a touch of the rotational input device 109 of the remote control device 108 after a rotational actuation, causes a delay in the generation of a preview in a highlighted channel menu item.

Ceasing a touch actuation, e.g., lifting a finger off the rotational input device 109 of the remote control device 108, causes the generation of a preview in a highlighted channel menu item.

A hold left action rotates the channel navigation menu to the recordings navigation menu. For example, a hold left action causes the channel navigation menu 904 of FIG. 17A to rotate and show the recordings navigation menu 1002 of FIG. 22. Thus, the user need not revert in a hierarchical menu tree to change navigation menus, e.g., the user need not revert to the menu overlay 822 and then highlight and select the recordings navigation icon 830.

A click right action generates a full screen channel navigation menu. For example, a click right action causes a transition to the channel navigation menu 982, of FIG. 21.

A hold right action rotates the channel navigation menu to the browse navigation menu. For example, a hold right action causes the channel navigation menu 904 of FIG. 17A to rotate and show the browse navigation menu 1102 of FIG. 27.

A click up action dismisses the channels navigation menu 904.

A select action changes the channel to the currently highlighted channel. For example, pressing the select area on the rotational input of the remote control device 108 changes the channel to the channel corresponding to the highlighted channel menu item 918 of FIG. 17A.

FIG. 46 is an example state table 1580 for a recordings list state in a received context. The state table 1580 defines state transitions in response to remote control device actions received during a received context and while a recordings navigation menu is displayed, e.g., recordings navigation menu 1002 of FIG. 22.

A rotate action moves up or down the recordings list. For example, a rotational actuation in the clockwise direction moves the recording menu items 1016 down, and a rotational actuation in the counterclockwise direction moves the recording menu items 1016 up, and the menu items are highlighted accordingly.

A hold left action rotates the recordings navigation menu to a search navigation menu. For example, a hold left action causes the recordings navigation menu 1002 of FIG. 22 to rotate and show the search navigation menu 1162 of FIG. 29.

A hold right action rotates the recordings navigation menu to the channels navigation menu. For example, a hold right action causes the recordings navigation menu 1102 to rotate to the channels navigation menu 904 of FIG. 17A.

A click up action dismisses the recordings navigation menu 1002.

A click down action plays the recorded program corresponding to the highlighted recording menu item if the recording menu item is not a folder menu item.

A select action generates an action menu for a highlighted recording menu item that includes information for a single recording (e.g., recording menu item 1004 of FIG. 22), or generates additional menu items for recording menu items corresponding to a collection of recordings (e.g., recording menu item 1010 of FIG. 22).

FIG. 47 is an example state table 1600 for a recordings list state in a received context. The state table 1600 defines state transitions in response to remote control device actions received during a received context and while a recordings navigation menu within a collection of recordings is displayed, e.g., recordings menu item 1002 of FIG. 24.

A rotate action moves up or down the recordings list. For example, a rotational actuation in the clockwise direction moves the recording menu items 1032 down, and a rotational actuation in the counterclockwise direction moves the recording menu items 1032 up, and the menu items are highlighted accordingly.

A hold left action rotates the recordings navigation menu to a search navigation menu. For example, a hold left action causes the recordings navigation menu 1002 of FIG. 22 to rotate and show the search navigation menu 1162 of FIG. 29.

A hold right action rotates the recordings navigation menu to the channels navigation menu. For example, a hold right action causes the recordings navigation menu 1102 to rotate to the channels navigation menu 904 of FIG. 17A.

A click up action reverts to the state described in state table 1580 of FIG. 46.

A click down action plays the recorded program corresponding to the highlighted recording menu item.

A select action generates an action menu. For example, a select action can generate the action menu 1052 of FIG. 25 that corresponds to a recorded program.

FIG. 48 is an example state table 1620 for a search state in a received context. The state table 1620 defines state transitions in response to remote control device actions received during a received context and while a search navigation menu for character input is displayed, e.g., the search navigation menu 1162 of FIG. 29.

A rotate action rotates through an alphabetical list of characters. For example, a rotational actuation of the rotational input device of the remote control device 108 rotates the rotation of the multidimensional surface 1166 of FIG. 29.

A click left action deletes an input character currently entered in a search field, e.g., search field 1170.

A click up action dismisses the search navigation menu. For example, a click up action can return to the menu overlay 822 of FIG. 13.

A click down action focuses on the search results. For example, a click down action can focus on the search results 1212 of FIG. 31.

A select action enters an input character into a search field. For example, a selection action can enter the highlighted input character "W" into the search field 1170, as shown in FIG. 30.

FIG. 49 is an example state table 1640 for a search state in a received context. The state table 1640 defines state transitions in response to remote control device actions received during a received context and while a focus on search results is displayed, e.g., search results 1212 of FIG. 31.

A rotate action moves up or down the search results list. For example, a rotational actuation in the clockwise direction moves the search results list 1212 down, and a rotational actuation in the counterclockwise direction moves the search results list 1212 up, and the menu items are highlighted accordingly.

A hold left action rotates the search results navigation menu to a browse navigation menu, e.g., browse navigation menu 1102 of FIG. 27.

A hold right action rotates the search results navigation menu to a recordings navigation menu, e.g., recordings navigation menu 1002 of FIG. 22.

A click up action reverts to the state described in state table 1620 of FIG. 48.

A hold up action dismisses the input characters and reverts to the state described in state table 1620 of FIG. 48.

A click down action either receives a broadcast program, if the broadcast program is currently being broadcast, or plays a recorded program corresponding to the highlighted search menu item.

A select action generates an action menu for a highlighted search menu item that includes information for a single item (e.g., search menu item 1216 of FIG. 31), or generates additional menu items for search menu items corresponding to a collection of search results (e.g., search menu item 1220 of FIG. 31).

FIG. 50 is an example state table 1660 for a browse state in a received context. The state table 1660 defines state transitions in response to remote control device actions received during a received context and while a browse menu is displayed, e.g., browse menu 1102 of FIG. 27.

A rotate action moves up or down the search browse list. For example, a rotational actuation in the clockwise direction moves the browse list 1104 down, and a rotational actuation in the counterclockwise direction moves the browse list 1104 up, and the menu items are highlighted accordingly.

A hold left action rotates the browse navigation menu to a channels navigation menu, e.g., channels navigation menu 904 of FIG. 17A.

A hold right action rotates the browse navigation menu to a search navigation menu, e.g., search navigation menu 1062 of FIG. 29.

A click up action dismisses the browse navigation menu. For example, a click up action can return to the menu overlay 822 of FIG. 13.

A click down action either receives a broadcast program, if the broadcast program is currently being broadcast, or plays a recorded program corresponding to the highlighted menu item.

A select action generates an action menu for a highlighted menu item that includes information for a single item (e.g., browse menu item 1146 of FIG. 28), or generates additional menu items for browse menu items corresponding to a collection of search results.

FIG. 51 is an example state table 1680 for a playback state in a playback context. The state table 1680 defines state transitions in response to remote control device actions received during a playback context while a video is played back.

A rotate action changes the state to a transport control state, which is described with respect to FIGS. 35-39 above.

A hold left action accesses the video data corresponding to a time that is, for example, 1 seconds previous.

A hold right action accesses the video data beginning at a time that is, for example, 30 seconds in the future.

A click up action generates an onscreen menu, e.g., the menu overlay 822.

A click down action pauses the video data being displayed and generates an information overlay and a transport bar, e.g., the information overlay 802 and transport bar 722.

A select action generates the information overlay, e.g., the information overlay 802.

Figure 52:
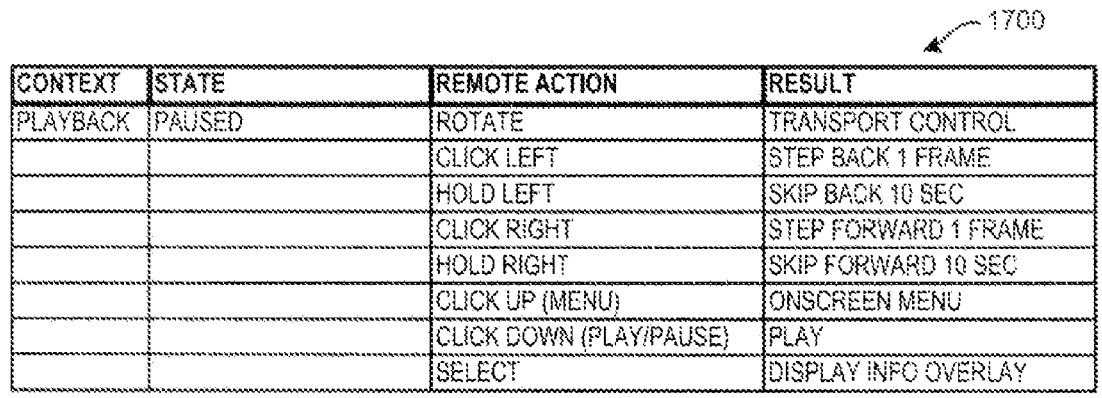
FIG. 52 is an example state table for a paused state in a playback context.

FIG. 52 is an example state table 1700 for a pauses state in a playback context. The state table 1700 defines state transitions in response to remote control device actions received during a playback context and while in a paused state.

A rotate action changes the state to a transport control state.

A click left action reverses the paused video data by one frame.

A hold left action accesses the video data corresponding to a time that is, for example, 10 seconds previous.

A click right action advances the paused video data by one frame.

A hold right action accesses the video data beginning at a time that is, for example, 30 seconds in the future.

A click up action generates an onscreen menu, e.g., the menu overlay 822.

A click down action reverts to the play state of state table 1680 of FIG. 51.

A select action generates the information overlay, e.g., the information overlay 802.

The state tables 1300, 1320, 1450, 1520, 1540, 1560, 1580, 1600, 1620 1640, 1660, 1680 and 1700 are example implementations for navigating various menu interfaces through use of a rotational input device 109. Other implementations can include additional state transitions. Additional, the systems and methods herein may be implemented in a remote control device with other user inputs in additional to a rotational input, e.g., buttons that are separate from the rotational input device 109 and included on the remote control device 108. Thus, some of the user interface functions can be redundantly implemented or separately implemented by other inputs. For example, a remote control device 108 may also include a pair of "Channel Up" and "Channel Down" buttons in addition to the rotational input device 109.

Figure 53:
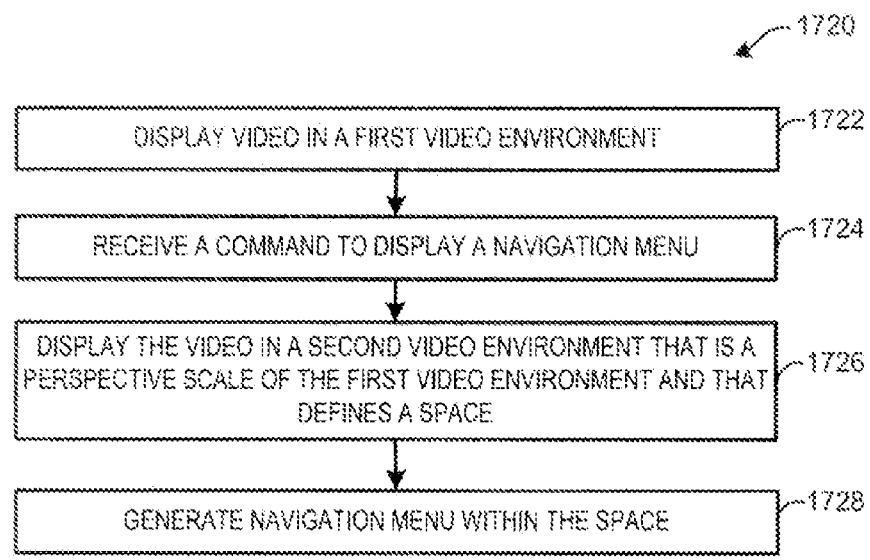
FIG. 53 is a flow diagram of an example navigation means process.

FIG. 53 is a flow diagram of an example navigation menu process 1720. In one implementation, the navigation menu process 1720 can be invoked by a select action for a highlighted navigation icon in the onscreen menu state to generate one of the recordings navigation menu 1002, channels navigation menu 904, browse navigation menu 1102, or search navigation menu 1162.

State 1722 displays video in a first environment. For example, the video may be displayed in the environment 702 of FIG. 13.

Stage 1724 receives a command to display a navigation menu. For example, the remote control 108 can transmit a navigation menu command to the controller engine 110 and/or processing device 102. The navigation menu command may correspond to a selection of one of the navigation icons 830, 832, 834, and 836.

Stage 1726 displays the video in a video environment that is a scale of the video environment, e.g., a perspective scale, and that defines a space. For example, the UI engine 112 and/or the processing device 102 may cause the video to be displayed in the video environment 902 of FIG. 17A, which defines the space 910.

Stage 1728 generates a navigation menu within the space. For example, the UI engine 112, in conjunction with one of the recording engine 114, channel engine 116, browse engine 118 or search engine 120 and/or the processing device 102 may generate the recordings navigation menu 1002, the channels navigation menu 904, the browse navigation menu 1102, or the search navigation menu 1162 within the space 910 depending on the selection of one of navigation icons 830, 832, 834, and 836.

Figure 54:
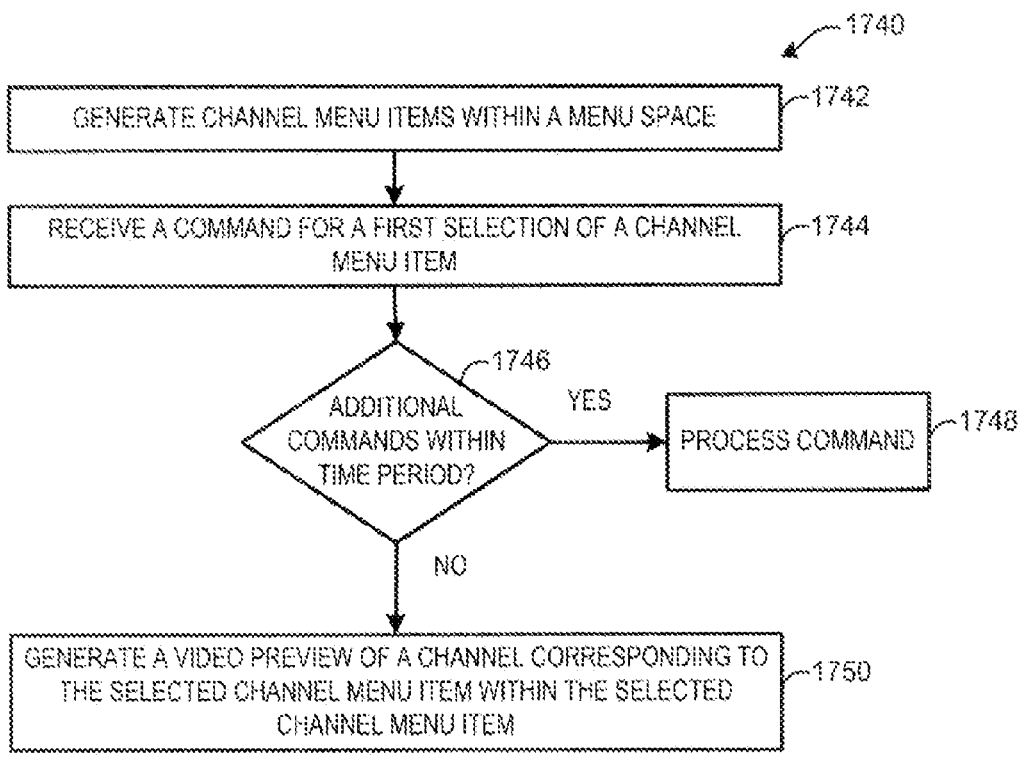
FIG. 54 is a flow diagram of an example channels navigation menu process.

FIG. 54 is a flow diagram of an example channels navigation menu process 1740. In one implementation, the channels navigation menu process 1740 can be used to generate and navigate the channels menu 904 of FIG. 17A.

Stage 1742 generates channel menu items with a menu space. For example, the UI engine 112, the channel engine 118 and/or the processing device 102 can generate the channel menu items 912 of FIG. 17A in the space 910.

Stage 1744 receives a command for a first selection of a channel menu item. For example, the UI engine 112, the channel engine 118 and/or the processing device 102 can generate a glow highlight beneath a channel menu item, such as the glow highlight 920 beneath the channel menu item 918 in FIG. 17A.

Stage 1746 determines if additional commands are received within a time period. For example, the control engine 110 and/or the processing device 102 may determine if any additional commands are received from the remote control device 108 during, for example, a three second period after a first selection of a channel menu item.

If additional commands are received within a time period, then stage 1748 processes the commands. For example, if a user continues to scroll through the channel menu items 912, the remote control device 108 will generate commands as the user actuates the rotational input device 109.

If additional commands are not received within a time period, then stage 1750 generates a video preview of a channel corresponding to the selected menu item within the selected menu item. For example, the UI engine 112, the channel engine 118 and/or the processing device 102 can generate the preview 944 in the highlighted menu item 918 of FIG. 19 if the menu item 918 is highlighted, for example, for three seconds and no additional commands are received.

The channels navigation menu process 1740 may also be applied in a similar manner to generate previews for recording menu items, browse menu items, and search menu items.

Figure 55:
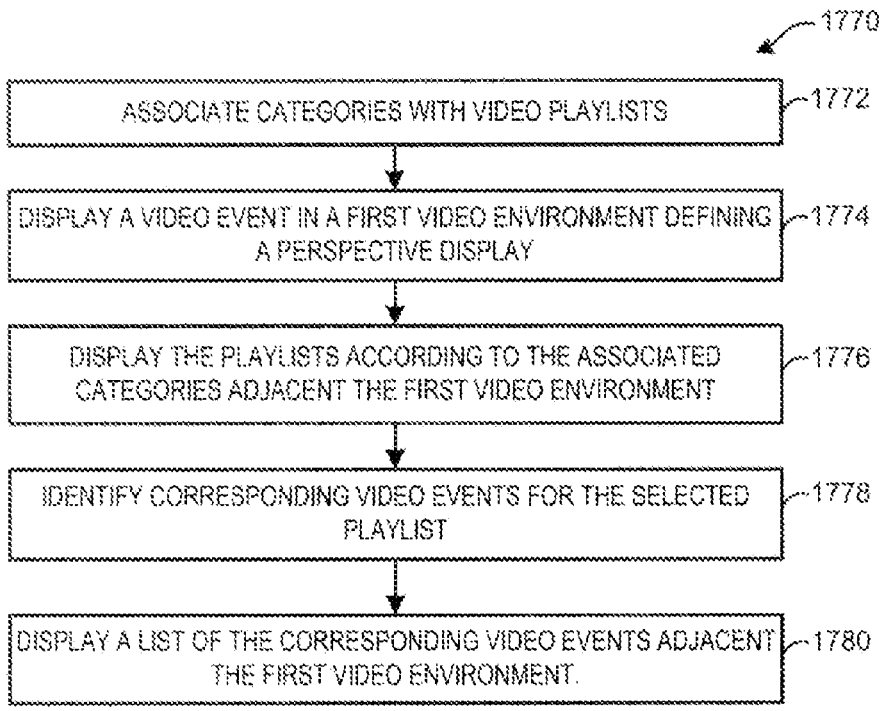
FIG. 55 is a flow diagram of an example playlist process.

FIG. 55 is a flow diagram of an example playlist process 1770. In one implementation, the playlist process 1770 may be used to generate the browse menu 1102 and playlists 1104 of FIG. 17A.

Stage 1772 associates categories with video playlists. For example, the categories may be defined by metadata searches, or may be predefined according pre-existing categories, e.g., drama, comedy, news, etc., or may be defined by the user, e.g., "Kathy's Favs." The categories and searches may be associated with playlists and stored in a data store, such as the data store 104 of FIG. 1A or 1B.

Stage 1774 displays a video event in a video environment defining a perspective display. For example, the UI engine 112 and/or the processing device 102 can display the video event in the environment 902 of FIG. 27.

Stage 1776 displays the playlists according to the associated categories in proximity to (e.g., adjacent) the video environment. For example, the UI engine 112, the browse engine 118 and/or the processing device 102 can display the playlists 1104 adjacent the video environment 902 of FIG. 27.

Stage 1778 identifies corresponding video events for a selected playlist. For example, the browse engine 118 can identify movies for the corresponding playlist 1110 of FIG. 27.

Stage 1780 displays a list of the corresponding video events in proximity to the video environment. For example, the UI engine 112, the browse engine 118 and/or the processing device 102 can display the video events 1144 of FIG. 28 adjacent the video environment 902.

Figure 56:
FIG. 56 is a flow diagram of another example playlist process.

FIG. 56 is a flow diagram of another example playlist process 1800. The playlist process 1800 can be utilized to define separate playlists for broadcast video data and recorded video data. Stage 1802 configures a first playlist for searching the video metadata of only broadcast video events, and stage 1804 configures a second playlist for searching the video metadata of only recorded video events. For example, the browse engine 118 can configure the first and second playlists for searching broadcast video events and recorded video events, respectively.

Figure 57:
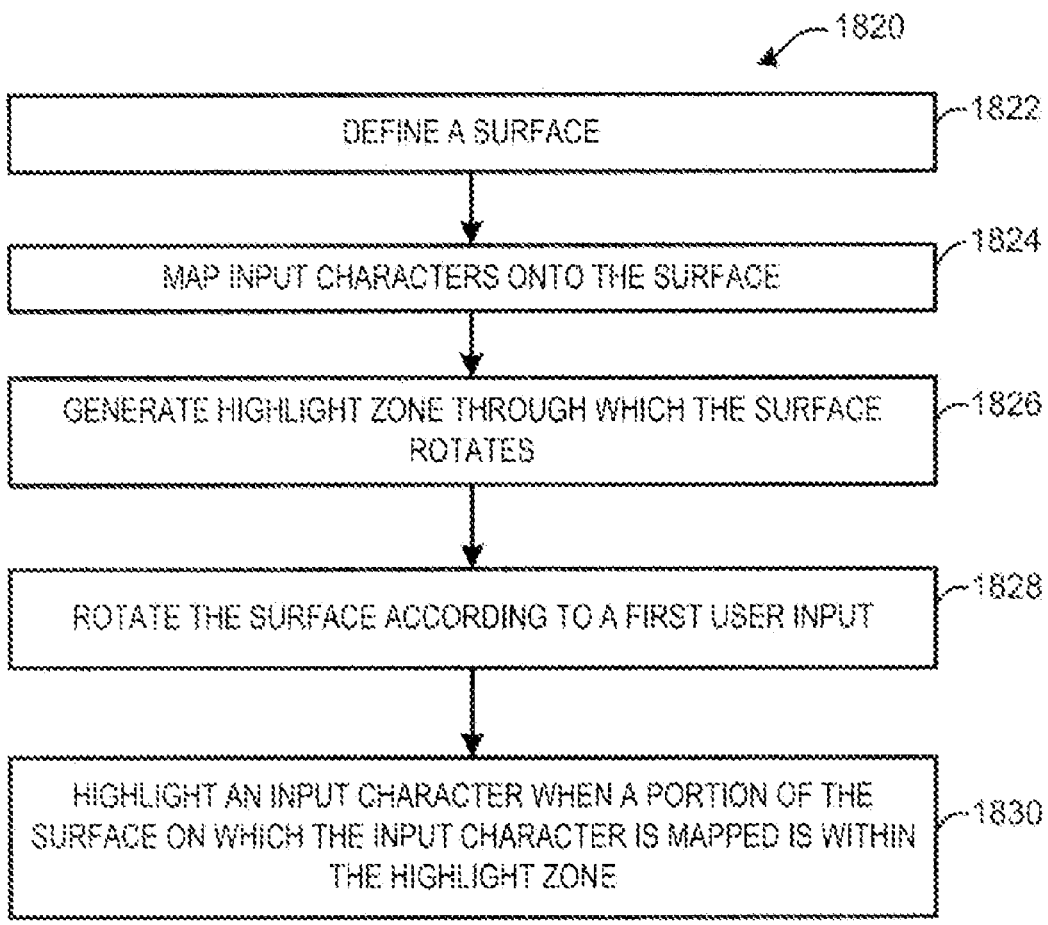
FIG. 57 is a flow diagram of an example search menu process.

FIG. 57 is a flow diagram of an example search menu process 1820. In one implementation, the search menu process 1800 may be used to generate the search navigation menu 1162 of FIG. 29.

Stage 1822 defines a surface, such as a multidimensional surface. For example, the UI engine 112, search engine 120 and/or processing device 102 can define a cylindrical displacement surface 1166 as shown in FIG. 29.

Stage 1824 maps input characters onto the surface. For example, the UI engine 112, search engine 120 and/or processing device 102 can map letters and numerals onto the cylindrical displacement surface 1166, as shown in FIG. 29.

Stage 1826 generates a highlight zone through which the surface rotates. For example, the UI engine 112, search engine 120 and/or processing device 102 can generate the highlight zone 1168 of FIG. 29.

Stage 1828 rotates the surface according to a first user input. For example, in response to a control signal generated by a rotational actuation on a rotational input device 109 of the remote control device 108, the UI engine 112, search engine 120 and/or processing device 102 can rotate the cylindrical displacement surface 1166 of FIG. 29.

Optionally, stage 1830 highlights an input character when a portion of the surface on which the input character is mapped is within the highlight zone. For example, the UI engine 112, search engine 120 and/or processing device 102 can highlight the letter "A" as shown in FIG. 29 when the portion of the cylindrical displacement surface 1166 on which the letter "A" is mapped is within the highlight zone 1168.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
presenting a video environment capable of displaying videos;
displaying a video in the video environment;
presenting an overlay within the video environment while maintaining the video within the video environment;
determining that a source for the video is a recorded video source;
automatically presenting an interactive delete icon within the overlay;
determining that the source for the video has changed from a recorded video source to a broadcast video source; and
automatically replacing the delete icon within the overlay with an interactive record icon.

2. The method of claim 1, further comprising:
presenting within the overlay one or more navigation icons.

3. The method of claim 2, wherein the navigation icons are independent of the context in which the video is currently being displayed.

4. The method of claim 2, further comprising:
sensing a rotational input from a rotational input device;
generating selection commands from the rotation input; and
selecting one of the navigation icons or context-dependent icons based on the selection commands.

5. The method of claim 4, further comprising:
generating a glow highlight beneath a selected one of the navigation icons or context-dependent icons.

6. The method of claim 2, further comprising:
delimiting a first overlay region within the overlay in which the one or more context-dependent icons are displayed; and
delimiting a second overlay region within the overlay in which the one or more navigation icons are displayed.

7. The method of claim 1, wherein generating the overlay within the video environment while maintaining the video within the video environment comprises generating a translucent overlay.

8. The method of claim 1, wherein generating the overlay within the video environment while maintaining the video within the video environment comprises maintaining the video within the overlay.

9. A method, comprising:
presenting an onscreen display area capable of displaying videos in multiple contexts;
receiving a video from a source;
displaying the video in the onscreen display area in a particular context;
receiving a user input; and
in response to the received user input,
determining that the source is a recorded video source,
automatically presenting a first overlay that includes an interactive delete icon within the onscreen display area while displaying the video in a playback context and while maintaining the video within the onscreen display,
determining that the source has changed from the recorded video source to a broadcast video source, and
automatically replacing the first overlay with a second overlay that includes an interactive record icon within the onscreen display area while displaying the video in a received context and while maintaining the video within the onscreen display area.

10. The method of claim 9, further comprising:
presenting within the first overlay one or more navigation icons.

11. The method of claim 10, wherein the navigation icons are context independent.

12. The method of claim 11, further comprising:
sensing a rotational input from a rotational input device;
generating a selection command from the rotation input; and
selecting one of the navigation icons or the context-dependent icon based on the selection command.

13. The method of claim 9, further comprising:
generating icon reflections for each of the navigation icons and the context-dependent icon within the overlay.

14. The method of claim 13, wherein the icon reflections depict a surface reflection for each of the navigation icons and the context-dependent icon.

15. The method of claim 9, wherein generating the overlay within the onscreen display area while maintaining the video within the onscreen display comprises maintaining the video within the overlay.

16. A video processing system, comprising:
a video input device to receive video data;
a data store in communication with the video input device to provide the video data as either recorded video data or as broadcast video data;
a handheld remote including an input to generate remote control signals; and
a processing device in communication with the video input device, the data store and the handheld remote, the processing device configured to perform operations comprising:
processing and displaying video data provided by the data store in multiple contexts in a video environment;
displaying a video in the video environment;
in response to a first user input received from the handheld remote,
determining that the video is recorded video data,
presenting an overlay within the video environment while maintaining the video within the video environment, presenting an interactive delete icon within the overlay when the video is displayed in a playback context, determining that the recorded video data has been replaced with broadcast video data, and automatically replacing the delete icon with an interactive record icon within the overlay when the video is displayed in a received context.

17. The video processing system of claim 16, wherein the processing device is further configured to present within the overlay one or more context independent navigation icons.

18. The video processing system of claim 16, wherein the processing device is further configured to maintain the video within the video environment by maintaining the video within the overlay.

19. A video system, comprising:
a display configured to present a video in a video environment in a playback context when the video is received from a source that provides recorded video or a received context when the video is received from a source that provides broadcast video;
a handheld remote having an input device and configured to generate remote control signals in response to user input;
a control engine configured to receive the remote control signals generated by the handheld remote in response to user input and to generate control signals in response; and
a user interface engine in communication with the control engine and, in response to a first control signal from the control engine, configured to present an overlay within the video environment while maintaining a first video within the video environment, and configured to present within the overlay an interactive record when the video is received from the source that broadcasts video, and configured to automatically replace the record icon with an interactive delete icon when the video is received from the source that provides recorded video.

20. The video system of claim 19, wherein the user interface engine is further configured to generate a glow highlight beneath a selected icon.

21. The video system of claim 19, wherein the user interface engine is further configured to generate a translucent overlay.

22. The video system of claim 19, wherein the user interface engine is further configured to maintain the video currently being displayed within the overlay.

23. A video processing system, comprising:
means for displaying a video in one of a playback context when the video is received from a source that records video or a received context when the video is received from a source that provides broadcast video in a first video environment;
means for receiving user input;
means for generating an overlay within the first video environment while maintaining the video environment in response to the user input, wherein maintaining the video environment comprises continuing to display the video; and
means for generating within the overlay one or more context-dependent icons corresponding to the first context in which the video is being displayed, comprising generating an interactive delete icon when the video is received from the source that provides recorded video, and automatically replacing the delete icon with an interactive record icon when the video is received from the source that provides broadcast video.

24. A method, comprising:
displaying a video in a video environment;
receiving a user input;
in response to the received user input,
determining that the video is received from a recorded video source,
in response to determining that the video is received from the recorded video source, presenting an interactive delete icon within the video environment while continuing to display the video within the video environment
determining that the video is received from a broadcast video source instead of the recorded video source, and
in response to determining that the video is received from the broadcast video source instead of the recorded video source, automatically replacing the delete icon with an interactive record icon within the video environment while continuing to display the video within the video environment.

25. A video processing system, comprising:
a video interface configured to receive video data; and
a processor in communication with the video interface and a handheld remote, the processing device configured to perform operations comprising:
processing and displaying video in multiple contexts;
in response to a first user input received from the handheld remote,
receiving video data from a recorded video source;
in response to receiving video data from the recorded video source, presenting an overlay within the video environment while continuing to display the video data within the video environment;
presenting within the overlay an interactive delete icon when the video is displayed in a playback context;
determining that the video data is received from a broadcast video source instead of the recorded video source; and
in response to determining that the video data is received from the broadcast video source instead of the recorded video source, automatically replacing the delete icon with an interactive record icon when the video is displayed in a received context.

26. A method, comprising:
presenting a video environment capable of displaying videos in each of a plurality of contexts, wherein each context corresponds to a way video data is processed and the plurality of contexts include a playback context for the playback of recorded video when the video is received from a source that provides recorded video and a received context for presenting broadcast video when the video is received from a source that provides broadcast video;
displaying a video in the video environment in a particular context;
receiving a user input;
in response to the received user input,
determining that the video is received from the source that provides recorded video
presenting an overlay within the video environment while maintaining the first video within the video environment, and presenting within the overlay an interactive delete icon when the video is displayed in the playback context,
determining that the source has changed from the source that provides recorded video to the source that provides broadcast video, and in response to determining that the source has changed from the source that provides recorded video to the source that provides broadcast video, automatically replacing the delete icon with an interactive record icon when the video is displayed in the received context and when the video is received from the video source that provides broadcast video.

27. The method of claim 1, further comprising:

delimiting a context icon overlay region within the overlay in which the one or more context-dependent icons are displayed; and delimiting a navigation icon overlay region within the overlay, wherein the navigation icon overlay region is different from the context icon overlay region;

generating one or more navigation icons within the navigation icon overlay region, wherein each navigation icon is independent of the determined context in which the video is currently being displayed.

28. A method, comprising:

presenting a video environment capable of displaying videos in multiple contexts including a particular context that is either a playback context in which video displayed is recorded video received from a source that provides recorded video or a received context in which video displayed is received from a source that provides broadcast video;

displaying a video in the video environment;

receiving a user input;

in response to the received user input, presenting an overlay within the video environment while maintaining the video within the video environment;

determining the particular context;

presenting within the overlay an interactive delete icon upon determining that the particular context is the playback context and that the displayed video is received from the source that provides recorded video; and automatically replacing the delete icon with an interactive record icon upon determining that the particular context is the a record context and that the displayed video is received from the source that provides broadcast video.

29. The method of claim 28, further comprising:

receiving input selecting one of the one or more generated context-dependent icons; and changing the selected context-dependent icon as a result of the selection.

* * * * *

UNITED STATES PATENT AND TRADEMARK OFFICE
CERTIFICATE OF CORRECTION

PATENT NO. : 8,243,017 B2  
APPLICATION NO. : 11/549053  
DATED : August 14, 2012  
INVENTOR(S) : Rainer Brodersen et al.

Page 1 of 1

It is certified that error appears in the above-identified patent and that said Letters Patent is hereby corrected as shown below:

In column 31, line 34, in Claim 19, delete "record" and insert -- record icon --.

In column 32, line 59, in Claim 26, delete "video" and insert -- video, --.

In column 34, line 16, in Claim 28, delete "the a" and insert -- the --.

Signed and Sealed this
Eighteenth Day of December, 2012

David J. Kappos
*Director of the United States Patent and Trademark Office*